US010896398B1

(12) United States Patent
Freed et al.

(10) Patent No.: US 10,896,398 B1
(45) Date of Patent: Jan. 19, 2021

(54) CUSTOMER DRIVEN ACTIVATION OF MERCHANT DELIVERY SERVICE AREAS

(71) Applicant: Amazon Technologies, Inc., Seattle, WA (US)

(72) Inventors: Ian W. Freed, Seattle, WA (US); Gustavo Eduardo Lopez, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 947 days.

(21) Appl. No.: 15/383,666

(22) Filed: Dec. 19, 2016

(51) Int. Cl.
*G06Q 10/08* (2012.01)
*G06Q 30/02* (2012.01)
*G06Q 50/12* (2012.01)

(52) U.S. Cl.
CPC ....... *G06Q 10/083* (2013.01); *G06Q 30/0239* (2013.01); *G06Q 50/12* (2013.01)

(58) Field of Classification Search
CPC ... G06Q 30/02; G06Q 30/0239; G06Q 10/083
See application file for complete search history.

(56) References Cited

U.S. PATENT DOCUMENTS

2013/0117193 A1* 5/2013 Ni .................... G08G 1/202
705/334
2018/0012287 A1* 1/2018 Ma ...................... G06Q 10/083

OTHER PUBLICATIONS de Koster, "Distribution Strategies for Online Retailers" (published in IEEE Transactions on Engineering Management on Nov. 1, 2003) (Year: 2003).*

* cited by examiner

*Primary Examiner* — James M Detweiler
*Assistant Examiner* — Patrick Kim
(74) *Attorney, Agent, or Firm* — Athorus, PLLC

(57) ABSTRACT

Inactive areas of interest to a merchant delivery service may be identified and customers within those areas may be utilized to recruit eligible merchants to participate with a merchant delivery service so that the merchant delivery service can deliver customer ordered products on behalf of participating merchants to the customers within the area. In some implementations, the merchant delivery service may provide incentives to customer to incent the customers to recruit eligible merchants to participate with the merchant delivery service. Likewise, incentives may be provided to merchants to incent merchants to participate in the merchant delivery service. When an eligible merchant becomes a participating merchant, the merchant delivery service provides a reward to the customers that recruited the merchant.

17 Claims, 12 Drawing Sheets

CUSTOMER DRIVEN ACTIVATION OF MERCHANT DELIVERY SERVICE AREAS

BACKGROUND

Merchant delivery services, such as local food delivery, is becoming increasingly popular, especially in densely populated areas. A merchant delivery service typically signs up merchants so that customers can order products, such as food, from those merchants and have the ordered products delivered to the customer by the merchant delivery service.

Merchant delivery services provide numerous benefits. From the merchant's perspective, the merchant can reach additional customers, thereby increasing sales, offer product delivery to customers, etc. For customers, the merchant delivery service increases product selection that is available for purchase and delivery to the customer.

However, each merchant delivery service typically requires the merchants to utilize an interface that is specific to that merchant delivery service. Likewise, because many of the merchants are independent, there is a significant acquisition cost incurred by the merchant delivery service to acquire each merchant as a participant with the merchant delivery service. For example, getting a merchant to participate with a merchant delivery service often requires cold calls, multiple meetings by employees of the merchant delivery service with each merchant, negotiation of legal documents, training, etc. If the merchant decides not to participate, this upfront investment cost is lost. Likewise, even if the merchant does participate, if the merchant does not produce enough sales, the merchant delivery service may not recover the acquisition cost for that merchant.

DETAILED DESCRIPTION

Figure 1:
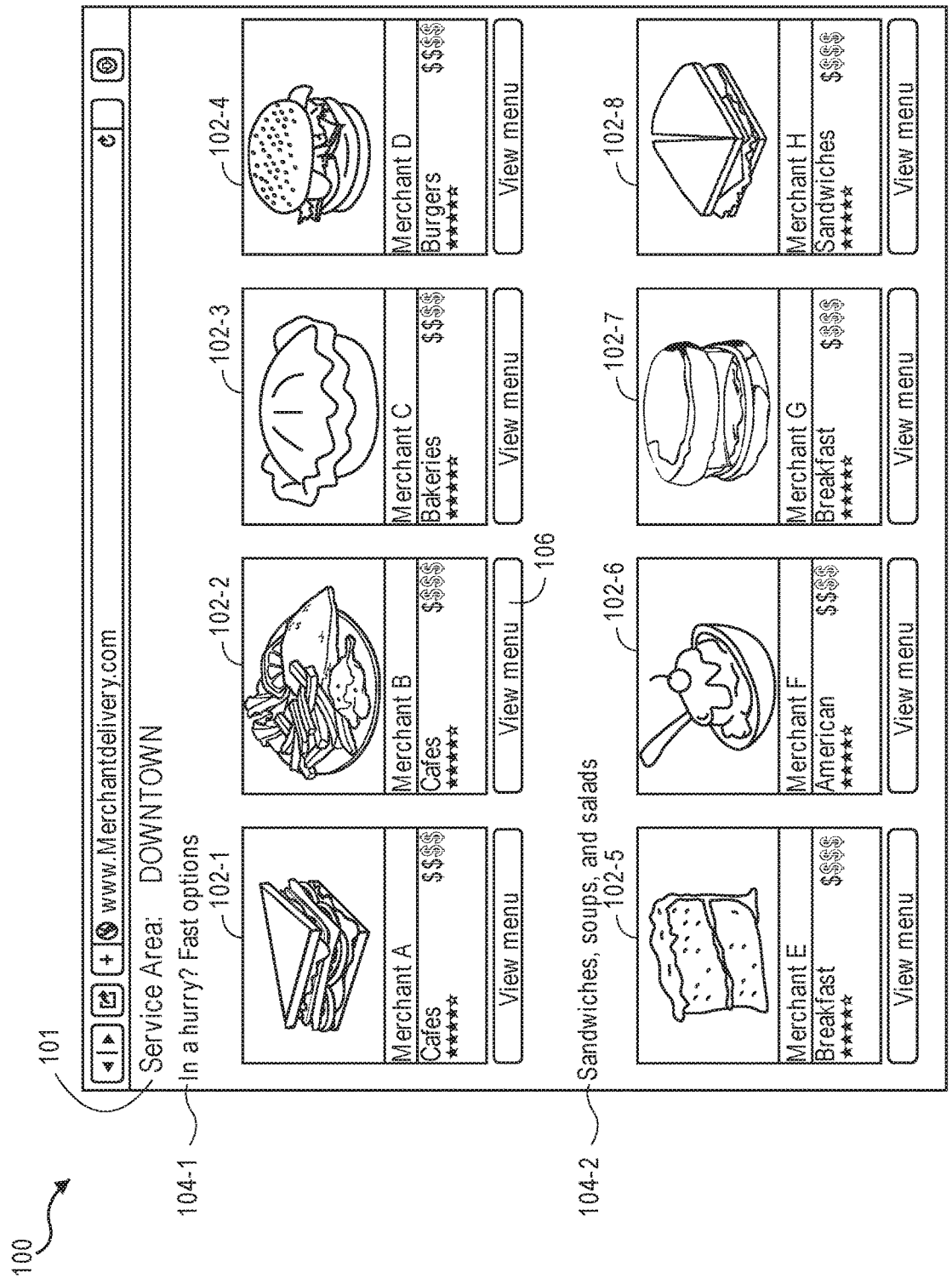
FIG. 1 is a user interface illustrating merchants offering products for delivery by a merchant delivery service within an area, in accordance with implementations of the present disclosure.

As is set forth in greater detail below, the present disclosure is directed to a merchant delivery service that utilizes customers to drive recruitment and participation by eligible merchants with the merchant delivery service. For example, the merchant delivery service may determine an area in which the merchant delivery service is not operating, determine eligible merchants in the area, and provide incentives to customers to recruit the merchants so that the merchants will participate with the merchant delivery service and allow the delivery service to deliver products (e.g., meals) on behalf of the merchants. Customer incentives may include discounts on products from the merchant, discounts on products delivered by the merchant delivery service, public recognition, monetary compensation, etc.

As eligible merchants are converted to participating merchants, customers that contacted and recruited those merchants receive the incentives as a reward for recruiting the merchants and to encourage the customers to recruit other merchants within the area to participate with the merchant delivery service. In some implementations, eligible merchants may also be incented to become a participating merchant with the merchant delivery service. Incentives for eligible merchants may include, for example, preferred branding placement, free marketing, reduced advertising fees, inclusion of the merchant on mailers distributed by the merchant delivery service, reduced revenue sharing requirements for a period of time, preferred placement on user interfaces of the merchant delivery service, inclusion of the merchant in promotions or advertising campaigns of the merchant delivery service, etc.

In some implementations, before an area is activated such that customers can order products from participating merchants for delivery by the merchant delivery service, a minimum number of eligible merchants that service the area must be converted to participating merchants. For example, a selection may be necessary to support customer orders by the service. To provide the selection, a minimum number of eligible merchants must be converted to participating merchants that work with the merchant delivery service so that merchant products may be ordered and delivered by the merchant delivery service within the area. Incentives may be provided to customers to incent merchants to join so that the merchant delivery service will have the needed minimum number of participating merchants. As eligible merchants are converted to participating merchants for an area, the customer incentive to recruit the remaining merchants may be altered. For example, if only a few more participating merchants are needed, the incentive to customers to recruit a few more eligible merchants to become participating merchants may be increased.

Once the minimum number of participating merchants for an area has been satisfied, ordering of products from those merchants for delivery by the merchant delivery service may be activated. Likewise, a notification, such as marketing and/or advertising, may be sent to customers within the area informing the customers that ordering from the participating merchants for delivery by the merchant delivery service within the area is available. In some implementations, incentives may also be provided to customers and/or eligible merchants even after the area has become active. For example, even though the minimum number of participating merchants may exist and the area is active, the merchant delivery service may continue to incent customers to recruit eligible merchants and/or incent other eligible merchants that service the area to convert to participating merchants to further increase the selection and variety of products offers for delivery to customers by the merchant delivery service within the area.

As used herein, a "merchant" is any entity or business that provides a product or item that may be ordered by a customer. An "eligible merchant," as used herein, is any merchant that satisfies one or more minimum requirements specified by the merchant delivery service to participate with the merchant delivery service and to have merchant products delivered by the merchant delivery service. An eligible merchant and the corresponding minimum requirements are discussed further below. A "participating merchant," as used herein, is an eligible merchant that has agreed to participate with the merchant delivery service and has fulfilled any requirements necessary for the merchant delivery service to deliver products on behalf of the merchant. An "active merchant," as used herein, is a participating merchant for which the merchant delivery service is receiving orders for the merchant's products from customers and/or delivering ordered products to customers on behalf of the merchant. It will be appreciated that a participating merchant may or may not be an active merchant. For example, and as discussed further below, a participating merchant may be located in an inactive area that is being developed into an active area but the merchant delivery service is currently not accepting orders and/or delivering products in the inactive area until a minimum number of participating merchants for the area have joined the merchant delivery service.

An "active area," as used herein, is any geographic area in which the merchant delivery service delivers products to customers on behalf of participating merchants. An "inactive area," as used herein, is any geographic area in which the merchant delivery service is not delivering products to customers on behalf of participating merchants. An inactive area may be converted to an active area when a minimum number of participating merchants that service the area have joined the merchant delivery service. It will be appreciated that a participating merchant and/or an active merchant may deliver into multiple areas using the merchant delivery service.

In some implementations, an area is defined based on pre-defined zip codes. In other implementations, an area may be defined based on estimated travel times by a vehicle of the merchant delivery service. In other implementations, an area may be defined by a radial distance from a center point. In still other implementations, an area may be defined at a customer level based on the estimated travel times to specific customer locations. In general, an area may be any defined geographic space and may vary in size, shape, customer population, merchant population, etc.

The merchant delivery service may use any one or more modes of transportation, alone or in combination, to deliver merchant products ordered by customers from the merchant to the customer. For example, the merchant delivery service may utilize humans, human powered vehicles (e.g., bicycles, skate boards), human operated or controlled vehicles (e.g., human operated or controlled ground based vehicles, human operated or controlled water based vehicles, and human operated or controlled aerial vehicles), autonomous vehicles (e.g., autonomous ground based vehicles, autonomous water based vehicles, and autonomous aerial vehicles), etc., to facilitate transport of products from active merchants to customers.

FIG. 1 is a user interface 100 illustrating active merchants 102 offering products for delivery by a merchant delivery service within an area 101, in accordance with implementations of the present disclosure. In the illustrated example, the user interface is presenting active merchants based on categories 104 associated with those merchants within a selected area 101, in this example, Downtown.

Any number of active merchants may participate with the merchant delivery service and be associated with one or more categories. In other implementations, the merchant delivery service may specify a maximum number of merchants that may be presented for an area and/or may specify a maximum number of merchants per category for a specific area.

Categories may relate to any criteria by which merchants and/or merchant products may be sorted. For examples, categories may include, but are not limited to, types of product (e.g., fast food, cafes, bakeries, American, sandwiches, soups, and salads), price of the products, delivery time estimates, distance from customer, merchant ratings, etc.

In this example, the interface 100 represents merchants in two categories 104-1 and 104-2 for an area 101. In other examples, additional or fewer categories 104 may be presented. In this example, the first category 104-1 "Fast Options" indicates four active merchants 102-1, 102-2, 102-3, and 102-4. The second category 104-2 "Sandwiches, soups and salads" indicates four active merchants 102-5, 102-6, 102-7, and 102-8.

In some implementations, customers may select merchants from the interface 100, view menus or other product lists by selection of one or more control buttons 106 presented for a merchant and/or order products from the merchant directly from the interface 100. In such an example, delivery of the product may be automatically selected as delivery by the merchant delivery service. In other implementations, a customer may purchase a product directly from an active merchant and select to have the product delivered by the merchant delivery service. In either instance, upon ordering of a product by a customer, the merchant delivery service schedules and completes delivery of the product from the active merchant to the customer using one or more modes of transportation.

Figure 2:
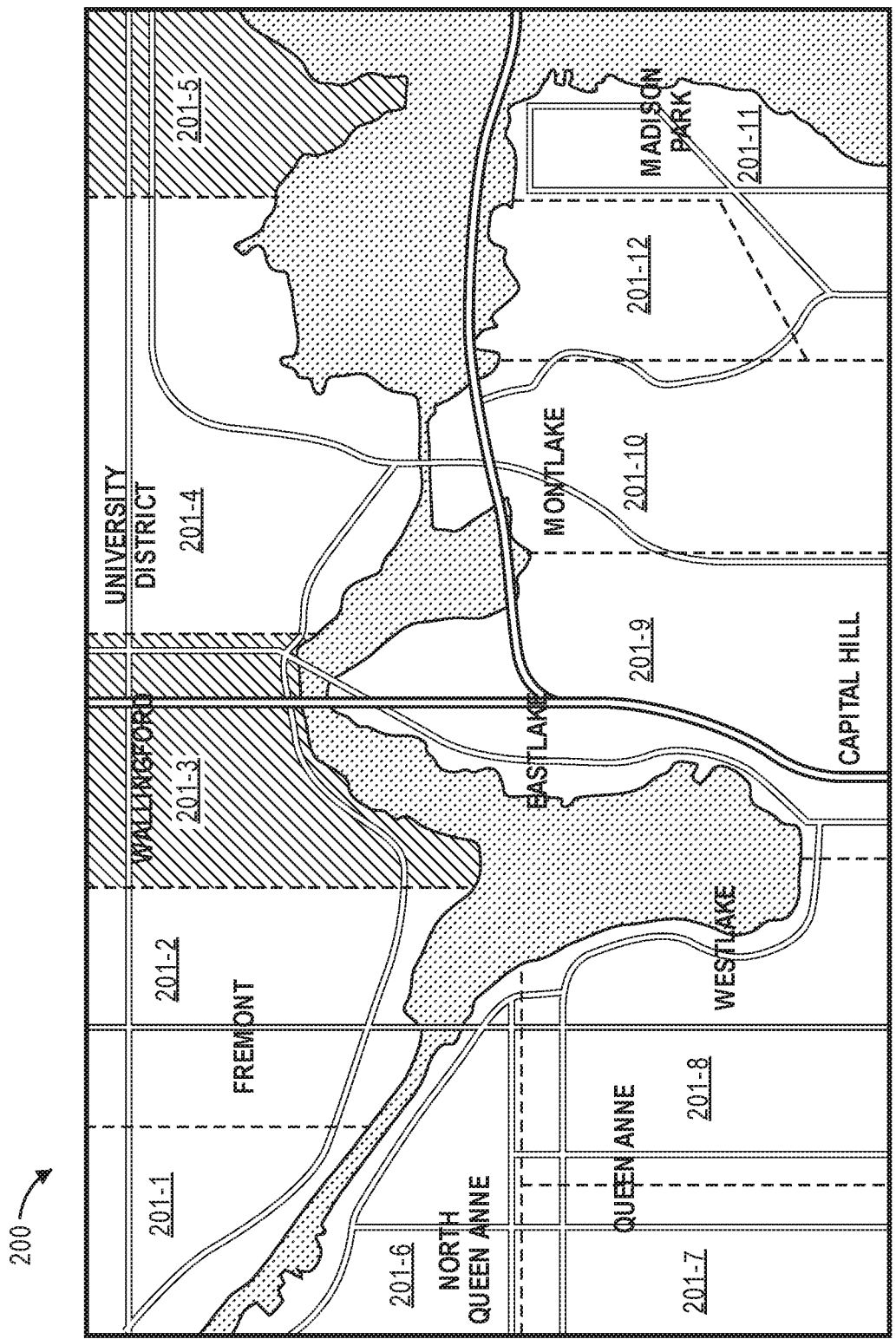
FIG. 2 is an illustration of different areas within a city in which the merchant delivery service is available and areas in which the merchant delivery service is not available, in accordance with implementations of the present disclosure.

FIG. 2 is an illustration 200 of different areas 201 within a city in which the merchant delivery service is available and areas in which the merchant delivery services is not available, in accordance with implementations of the present disclosure. In this example, the areas 201 have been determined based on estimated delivery times. For example, each area 201 may be defined based on an estimated delivery time of twenty-five minutes from a defined location within the area.

In the illustrated example, areas 201-1, 201-2, 201-4, 201-6, 201-7, 201-8, 201-9, 201-10, 201-11, and 201-12 are active areas and areas 201-3 and 201-5 are currently inactive areas. As discussed above, an inactive area is an area in which products from merchants that service the area are not available for purchase and delivery in the area by the merchant delivery service. In comparison, an active area is an area in which products from a merchant may be purchased by a customer and delivered to a customer location within the area by the merchant delivery service.

In some implementations, a customer may be presented with the interface 200 and may select an area 201 to receive a listing of merchants that deliver into the selected area, such as the user interface discussed above with respect to FIG. 1. In comparison, if a customer is interested in recruiting merchants within an inactive area to participate with the merchant delivery service so that the inactive area can become an active area, the customer may select the inactive area, such as inactive area 201-3, and receive an interface that provide additional details about the inactive area.

Figure 3:
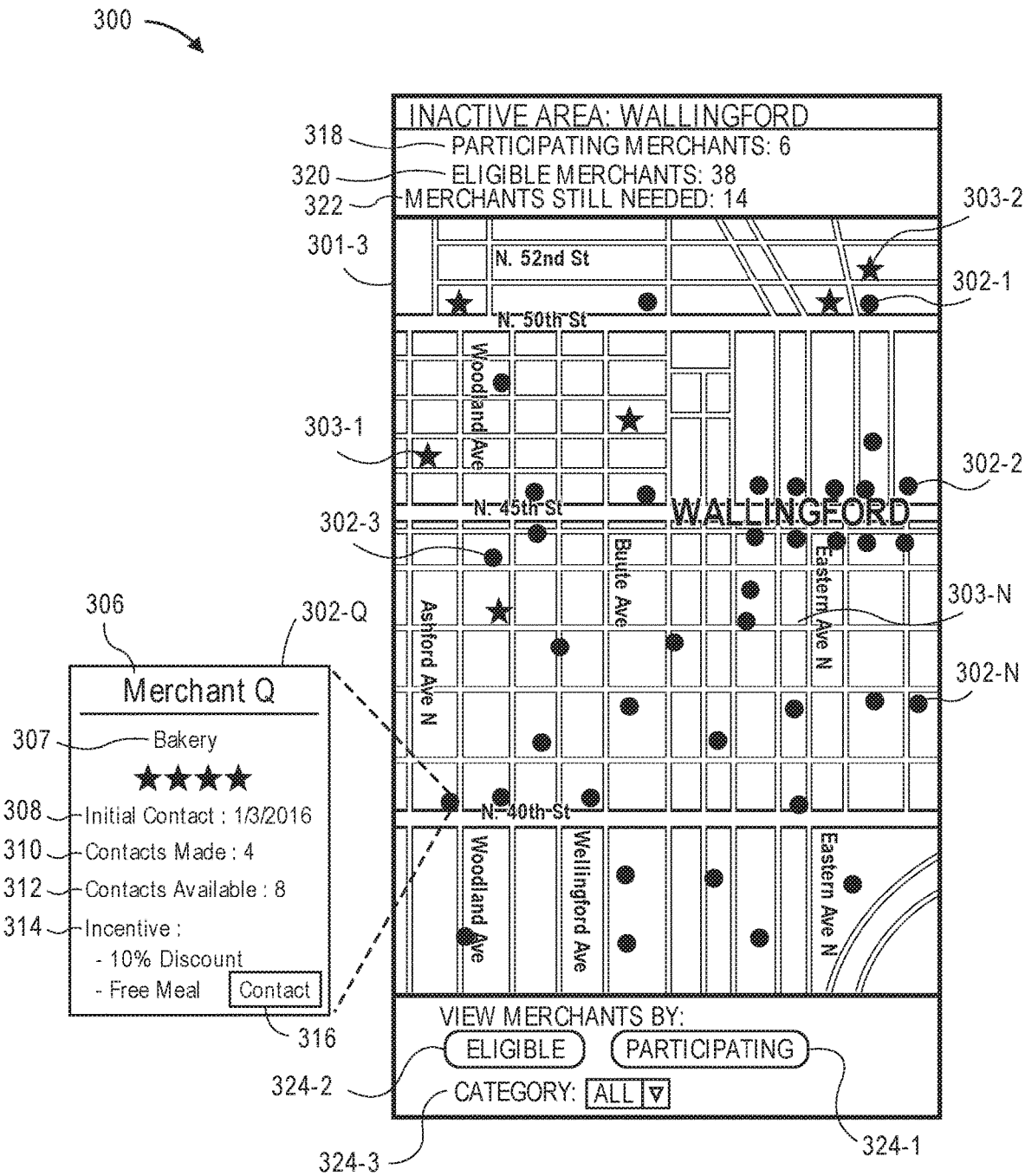
FIG. 3 is an illustration of an area in which the merchant delivery service is not yet available, indicating participating merchants and eligible merchants, in accordance with implementations of the present disclosure.

For example, FIG. 3 is an illustration 300 of an inactive area 301-3 in which the merchant delivery service is not yet available, in accordance with implementations of the present disclosure. The presented information may also provide information indicating a number of participating merchants 318, a number of eligible merchants 320, and a number of merchants needed 322 before ordering from and delivering by the merchant delivery service is activated for the area. In this example, the illustration 300 indicates that there are currently six participating merchants 318, thirty-eight eligible merchants 320, and that fourteen more of the eligible merchants still need to be converted from eligible merchants to participating merchants before the merchant delivery service is activated for the area. As will be appreciated, the number of eligible merchants, participating merchants, and/or merchants still needed may vary for different areas.

A user may view participating merchants 303 and eligible merchants 302 in total, as illustrated, or the user may interact with one or more of the filter controls 324 and select to view just participating merchants, just eligible merchants, and/or view participating merchants and/or eligible merchants by category. For example, a user may select the Eligible control 324-2 and specify a category using the Category control 324-3 to view on the interface only eligible merchants associated with a particular category. In another example, the user may select the Participating control 324-1 to view participating merchants within the area.

Any viewable combination of filters may be utilized. In the present illustration 300, eligible merchants are presented on the interface as solid round markers 302, such as eligible merchants 302-1, 302-2, 302-3, and 302-N. Participating merchants are presented on the interface as solid stars 303, such as participating merchants 303-1, 303-2, and 303-N. The presented location of a merchant 302, 303 within the interface corresponds to the physical location of the merchant 302, 303 within the inactive area 301-3 illustrated by the interface.

A user may also interact with the interface 300 to obtain additional information about a merchant, such as eligible merchant 302-Q, by selecting the marker for the merchant. For example, upon selection of the merchant 302-Q, an information window 306 is presented that provides information about the merchant. In this example, the selected merchant 302-Q, Merchant Q, is an eligible merchant associated with the category 307 "Bakery." Likewise, the information window 306 may indicate a date of initial contact 308, in this example, Jan. 3, 2016, a number of contacts made 310, in this example four, a number of available contacts 312, in this example eight, and an indication of the incentives 314, in this example a 10% discount on products from the merchant and free meal from the merchant.

As will be appreciated, in some instances it may take more than one contact and/or more than one customer contact to produce a conversion of an eligible merchant to a participating merchant. As discussed herein, the merchant delivery service may allow multiple customers to contact an eligible merchant to recruit the eligible merchant to participate with the merchant delivery service. In such an example, each customer that contacts the merchant to recruit the merchant may receive the same incentive if the merchant converts from an eligible merchant to a participating merchant. In this example, each customer receives a 10% discount on products from the merchant and a free meal from the merchant. In other implementations, the customers that contact the merchants to recruit the merchants may share the incentive and/or receive different incentives. For example, if the incentive is a three-hundred-dollar monetary reward and three customers contact the eligible merchant to recruit the eligible merchant, each customer may receive one third, or one hundred dollars, as their share of the incentive if the eligible merchant converts to a participating merchant.

While the examples discuss enabling multiple customers to contact a merchant to recruit the merchant, the merchant delivery service may put a limit on the number of contacts that may be made during a period of time. In the illustrated example, the merchant delivery service allows at total of twelve contacts by different customers to Merchant Q 302-Q during a period of time. Further, four customers have already contacted the merchant, as illustrated by the contacts made 310, but another eight customers can still contact the merchant to recruit the merchant, as illustrated by the contacts available 312.

In some implementations, a contact by a customer to a merchant may expire after a defined period of time, such as two months, if the merchant does not convert from an eligible merchant to a participating merchant during that period of time. In such an instance, the potential for the contacting customer to receive the incentive if the eligible merchant converts to a participating merchant is removed and the contacts available for that merchant is increased, so that additional contacts by additional customers to recruit the eligible merchant may be made.

In some implementations, a number of contacts by a single customer to different eligible merchants may also be limited. For example, a customer may be limited to only contacting twenty-five eligible merchants within an inactive area during a period of time. In other implementations, the number of contacts may be greater or less. Likewise, in some implementations, different customers may be allowed to contact a different number of eligible merchants during a period of time. For example, a customer who has already converted multiple eligible merchants and has shown a history of actively working to recruit eligible merchants to participate, may be allowed to contact a larger number of eligible merchants during a period of time compared to another customer who has not successfully recruited any eligible merchants to convert to participating merchants. Likewise, during the period of time, if a contacted eligible merchant converts to a participating merchant, the customer may be allowed to contact additional eligible merchants.

Returning to FIG. 3, a customer may request to contact a merchant by selecting the Contact control 316 for that merchant. Upon selection of the Contact control 316 the customer may receive an identifier that identifies at least one of the customer and/or the merchant. The identifier may be any form of identifier, such as a unique number, a uniform resource locator (URL), etc., that can be used by the merchant delivery service to determine that the customer contacted the eligible merchant. For example, upon selection of the Contact control 316, the user may be presented a sample message that the user can complete and send, for example using electronic mail, to the eligible merchant and the message may include a URL that identifies the customer as the source of the contact. Example sample messages are discussed further below with respect to FIG. 6C. The customer may complete the message and send the message to the eligible merchant. If the eligible merchant selects the URL included in the message, the eligible merchant is directed to information provided by the merchant delivery service and the merchant delivery service receives the URL and is able to confirm that the customer contacted the eligible merchant to recruit the eligible merchant to participate with the merchant delivery service.

In other implementations, other means may be used in addition to or as an alternative to an identifier to determine if a customer contacted a merchant to recruit the merchant. For example, the merchant may identify the customer(s) that recruited them, the customer may identify the merchant(s) they contacted to recruit, a customer and/or merchant may utilize a mobile device and/or software application operating on a mobile device (e.g., tablet, smart phone, wearable, laptop) while at the location of the merchant to verify that the customer has contacted the merchant to recruit the merchant, etc. In instances in which a mobile device is used to verify that a customer has contacted a merchant to recruit the merchant, the mobile device may be configured to transmit to the merchant delivery service identifying information (e.g., positioning information, user identifier, Wi-Fi identifier, etc.) that can be used to determine one or more of the merchant, the customer, and/or the location of the mobile device.

Figure 4:
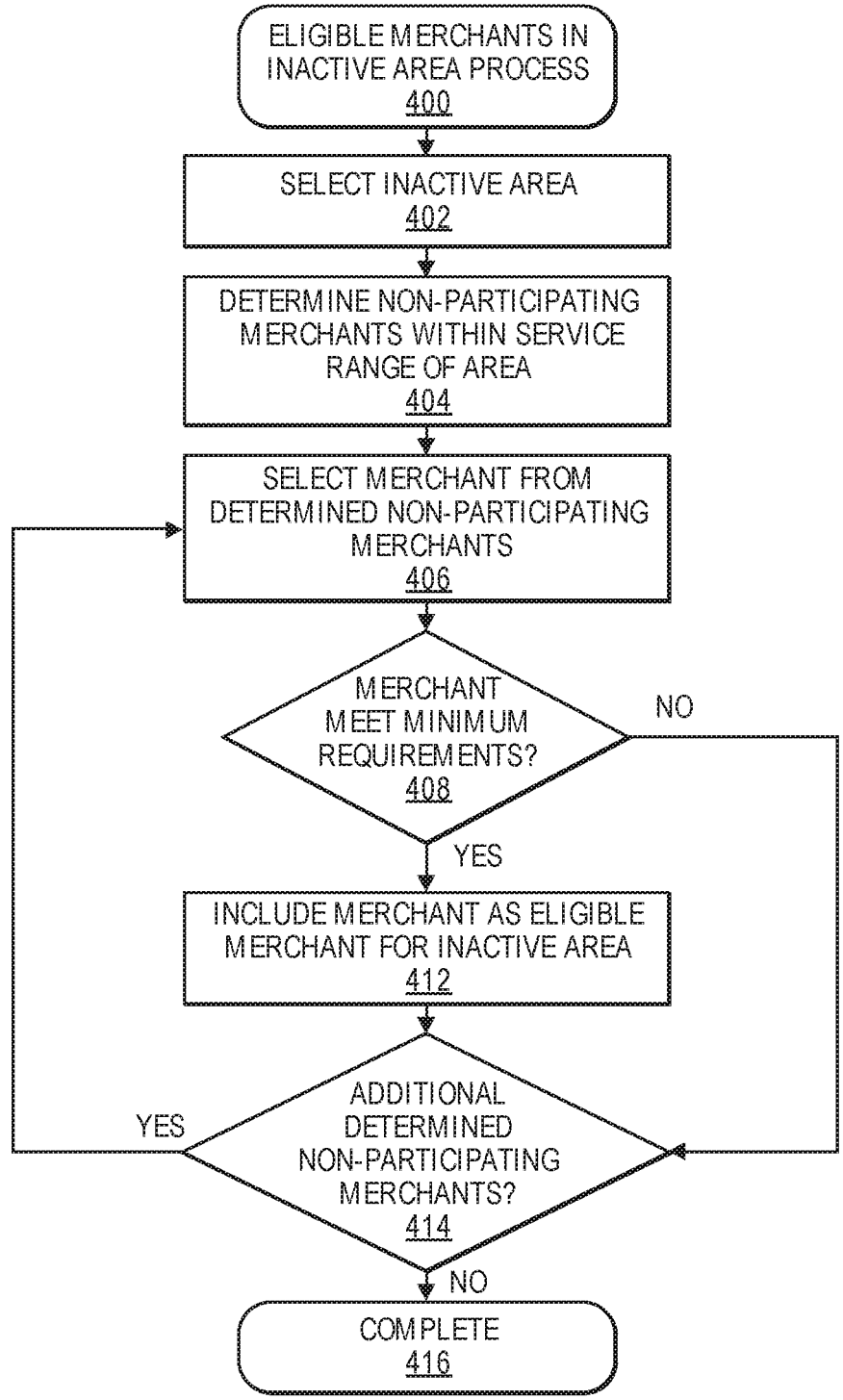
FIG. 4 is a flow diagram of an example process for determining eligible merchants in an inactive area, in accordance with implementations of the present disclosure.

FIG. 4 is a flow diagram 400 of an example process for determining eligible merchants in an inactive area, in accordance with implementations of the present disclosure. The example process 400 begins by selecting an inactive area, as in 402. As discussed above, an inactive area may be any area in which delivery of products from merchants within a service range of the area to customers within the area by the merchant delivery service is not available. An example inactive area is discussed and illustrated above with respect to FIGS. 2-3.

Upon selection of an inactive area, non-participating merchants within a service range of the area are determined, as in 404. A service range may be an area around and including the area within which delivery of a product from the merchant to a customer within the area can be completed within a defined period of time. For example, if the defined period of time is twenty-five minutes, the service range may include any merchants in and around the area for which an estimated delivery time for a product from the merchant to a customer location within the area is twenty-five minutes or less. The estimated delivery time may vary based on, for example, the mode of transportation, estimated traffic congestion (for ground based travel), etc. For example, if the merchant delivery service will use an automobile (human operated and/or autonomous), the estimated delivery time may be determined based on a route between the merchant and the customer and historical traffic and/or travel times along that route. In comparison, if the merchant delivery service will use an aerial vehicle, such as an unmanned aerial vehicle (UAV) to transport the product, the estimated delivery time may be based on a direct distance between the merchant and the customer that may be aerially navigated by the aerial vehicle.

Upon determination of non-participating merchants for the inactive area, a merchant from the plurality of non-participating merchants is selected, as in 406. Upon selection of a merchant, a determination is made as to whether the selected merchant satisfies one or more minimum requirements, as in 408. In various implementations, different minimum requirements may be specified for merchants to be considered for participation with the merchant delivery service. Minimum requirements may include, for example, a minimum customer rating on one or more social networks (e.g., at least a three out of five-star customer rating), a minimum rating by one or more professional rating services, a minimum sales volume, a minimum or maximum price range, a category association of a particular type, a minimum or maximum number of merchants associated with a category for the area, an estimated preparation time for products, hours of operation, a number and/or variety of products, different offerings (e.g., breakfast, lunch, and dinner), whether the merchant currently offers delivery, whether the merchant utilizes another merchant delivery service, etc. In some implementations, any merchant within a service range of an area may be considered and there may be no minimum requirements.

If it is determined that that selected merchant satisfies the one or more minimum requirements, the merchant is included as an eligible merchant for the inactive area, as in 412. However, if it is determined at decision block 408 that the selected merchant does not satisfy the minimum requirements, the merchant is not considered an eligible merchant and is not eligible to participate with the merchant delivery service. As discussed herein, indications of eligible merchants may be maintained in a data store and associated with the inactive area.

After either including the selected merchant as an eligible merchant or excluding the merchant from being an eligible merchant, a determination is made as to whether additional non-participating merchants within a service range of the inactive area are to be processed, as in 414. If additional non-participating merchants are to be processed, the example process 400 returns to block 406 and continues. However, if all non-participating merchants determined for the inactive area have been either included as an eligible merchant or excluded from being an eligible merchant, the example process 400 completes, as in 416.

Figure 5:
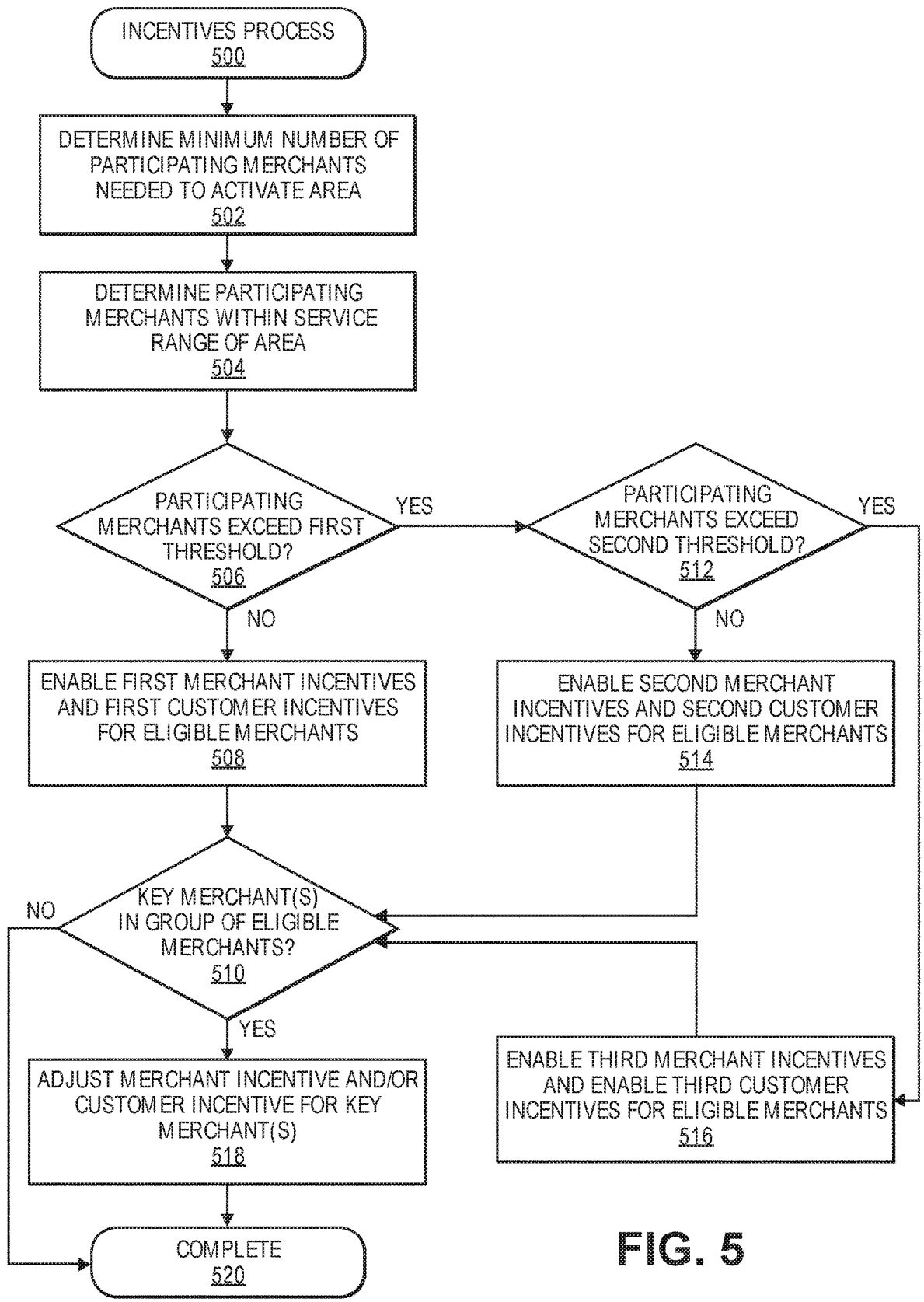
FIG. 5 is a flow diagram of an example incentives determination process, in accordance with implementations of the present disclosure.

FIG. 5 is a flow diagram of an example incentives determination process 500, in accordance with implementations of the present disclosure. The example process 500 begins by determining the minimum number of merchants needed to activate an area, as in 502. As discussed above, in some implementations, a minimum number of participating merchants from which products may be ordered and delivered by the merchant delivery service to customers within an area may be desirable so that customers have increased product selection and will utilize the merchant delivery service. In some implementations, the minimum number of participating merchants may depend on the area, the size of the area, the number of eligible merchants within the area, the number of customers within the area, desired categories for the area, etc. As such, it will be appreciated that the minimum number of participating merchants needed for the merchant delivery service to be activated and deliver products within an area may be different for different areas. In some implementations, a minimum number of participating merchants in one or more categories may be required before an area becomes active. For example, the merchant delivery service may require a minimum of five categories with at least three participating merchants in each category and at least a total of twenty-five participating merchants across all categories before the area can become active. In other examples, the number of categories, number of merchants in each category, and/or the total number of merchants may vary. Likewise, in some areas, a single participating merchant may be sufficient to activate the merchant delivery service for that area. In other areas, the minimum number of participating merchants may be forty participating merchants. In other areas, the minimum number of participating merchants may be higher or lower.

In addition to determining the minimum number of participating merchants needed to activate an area, the number of participating merchants already participating with the merchant delivery service and within the service range of the area is determined, as in 504. A determination may then be made as to whether the number of participating merchants exceeds a first threshold, as in 506. The first threshold may be any percentage, ratio, amount, etc. of the minimum number of needed merchants for the area. For example, the first threshold may be twenty-five percent of the minimum number of needed participating merchants. In other examples, the first threshold may be greater or less than twenty-five percent.

If it is determined that the number of participating merchants does not exceed the first threshold, first merchant incentives and first customer incentives may be enabled for eligible merchants determined for the area, as in 508. Eligible merchants may be determined for an area using the example process discussed above with respect to FIG. 4. Any variety of incentives may be established as the first merchant incentives and/or the first customer incentives. In general, first merchant incentives may be any form of incentive that may be provided to a merchant to incent the eligible merchant to convert to a participating merchant. For example, first merchant incentives may include preferred branding placement, free marketing, reduced advertising fees, inclusion of the merchant on mailers distributed by the merchant delivery service, reduced revenue sharing requirements for a period of time, preferred placement on user interfaces of the merchant delivery service, inclusion of the merchant in promotions or advertising campaigns of the merchant delivery service, etc. The incentives may be provided by the merchant delivery service and/or by one or more third parties.

In a similar manner, the first customer incentives may be any form of incentive available to a customer to incent the customer to recruit eligible merchants to convert to participating merchants and participate with the merchant delivery service. For example, customer incentives may include a discount on products from a converted merchant and/or other participating merchants, public recognition of the customer, credit or discounts for other services offered by the merchant delivery service, credit or other discounts with other businesses, free products, monetary rewards, gifts, etc.

In some implementations, a determination may also be made as to whether one or more key merchants are included in the group of eligible merchants for the area, as in 510. A key merchant may be any eligible merchant that is identified by the merchant delivery service as important or of higher interest to convert to a participating merchant. For example, a key merchant may be an eligible merchant with a higher than required customer rating, an eligible merchant with a fast product preparation time, an eligible merchant that provides a large volume of business, etc. If it is determined that one or more key merchants are included in the group of eligible merchants for the area, one or both of the merchant incentive or the customer incentive for those key merchants may be adjusted, as in 518. Adjustment of the merchant incentive and/or the customer incentive for key merchants may include increasing the amount of an incentive, adding additional incentives, or both increasing the amount of the incentive and adding additional incentives. For example, if the customer incentive for an eligible merchant is a ten percent discount, the customer incentive for key merchants may be increased to a twenty percent discount. In other examples, other adjustments to the incentives may be utilized. If it is determined at decision block 510 that there are no key merchants included in the group of eligible merchants, the example process completes, as in 520.

Returning to decision block 506, if it is determined that the number of participating merchants for the area does exceed the first threshold, a determination is made as to whether the participating merchants for the area exceeds a second threshold, as in 512. Like the first threshold, the second threshold may be any percentage, ratio, amount or otherwise of the minimum number of participating merchants needed for the area, as determined in block 502. For example, in one implementation, the second threshold may be ninety percent of the minimum number of needed participating merchants. In other implementations, the second threshold may be higher or lower. In some examples, the second threshold may be 100% of the minimum number of participating merchants. Alternatively, the second threshold may relate to a number of participating merchants in a particular category for the area.

If it is determined that the number of participating merchants does not exceed the second threshold but does exceed the first threshold (as determined in decision block 506), a second merchant incentive, second customer incentive, or both a second merchant incentive and second customer incentive are enabled, as in 514. The second merchant incentive and/or second customer incentive may be similar or different than the first merchant incentive and/or first customer incentive. In general, second merchant incentives may be any form of incentive that may be provided to a merchant to incent the eligible merchant to convert to a participating merchant. For example, first merchant incentives may include preferred branding placement, free marketing, reduced advertising fees, inclusion of the merchant on mailers distributed by the merchant delivery service, reduced revenue sharing requirements for a period of time, preferred placement on user interfaces of the merchant delivery service, inclusion of the merchant in promotions or advertising campaigns of the merchant delivery service, etc. The second merchant incentive may be more (or for a longer period of time), or less (or a shorter period of time) than the first merchant incentive.

In one example, if the number of participating merchants is close to the minimum number of needed participating merchants but has not continued to increase for a period of time, the second merchant incentive may be an increase above the first merchant incentive to incent eligible merchants to decide to participate with the merchant delivery service so that the minimum number of necessary participating merchants is satisfied and the area activated for purchase and delivery of products to customers within the area by the merchant delivery service. In other examples, if the number of participating merchants is increasing rapidly, the second merchant incentive may be less than the first merchant incentive to reward participating merchants that decided to participate early.

In a similar manner, the second customer incentives may be any form of incentive available to a customer to incent the customer to recruit eligible merchants to convert to participating merchants and participate with the merchant delivery service. For example, second customer incentives may include a discount on products from a converted merchant and/or other participating merchants, public recognition of the customer, credit or discounts for other services offered by the merchant delivery service, credit or other discounts with other businesses, free products, monetary rewards, gifts, etc. Similar to the second merchant incentive, the second customer incentive may be more or less than the first customer incentive. For example, if only a few more participating merchants are needed to satisfy the minimum number of needed participating merchants for the area but the remaining eligible merchants have been difficult to convert, the second customer incentive may be an increase to the first customer incentive to provide additional incentive to further incent customer efforts to convert the remaining eligible merchants so that the area can be activated and customers can order products from participating merchants and have those products delivered by the merchant delivery service. Upon enablement of the second merchant incentive and the second customer incentive, the example process 500 proceeds to block 510 and continues, as discussed above.

In some implementations, if it is determined that the number of participating merchants exceeds the second threshold, a third merchant incentive and/or a third customer incentive may be enabled, as in 516. Like the first merchant incentive, second merchant incentive, first customer incentive, and second customer incentive, the third merchant incentive and third customer incentive may be any form of incentive to incent the eligible merchants to participate in the merchant delivery service. The third merchant incentive and/or the third customer incentive may be greater or less than the first merchant incentive, second merchant incentive, first customer incentive, and/or the second customer incentive.

For example, if the second threshold is one-hundred percent of the minimum number of participating merchants needed for the area to become active, the third merchant incentive and/or the third customer incentive may be less than the first merchant incentive, second merchant incentive, first customer incentive, and/or the second customer incentive, because the area is now active and additional eligible merchants are not as critical for the area, but still desired to increase customer selection. In another example, if the second threshold is less than the minimum number of participating merchants necessary for area to become active, the third merchant incentive and/or the third customer incentive may be greater than the first merchant incentive, second merchant incentive, first customer incentive, and/or second customer incentive. In such an example, the third merchant incentive and/or third customer incentive may be increased to further incent eligible merchants to participate with the merchant delivery service so that the minimum number of necessary participating merchants is satisfied and the area can become active. Upon enablement of the third merchant incentive and the third customer incentive, the example process 500 proceeds to block 510 and continues, as discussed above.

In some implementations, as discussed further below, merchant incentives and/or customer incentives may only be provided to merchants and/or customers when a corresponding eligible merchant converts from an eligible merchant to a participating merchant. In other examples, the incentive may be provided to the customer as a reward for the customer's efforts to recruit the eligible merchant regardless of whether the eligible merchant converts to a participating merchant.

In some examples, the customer incentives, the merchant incentives, and/or the thresholds may include a temporal aspect. For example, the second customer incentive may include a time duration for which it is active and upon expiration of the time duration the second customer incentive may be de-activated. In one example, a customer incentive to recruit a specific eligible merchant, such as a key merchant in a particular category may be established and a time duration (e.g., five days) may be established during which the customer incentive is active for that key merchant. If a customer recruits the merchant during that time period and the merchant converts, the customer receives the incentive. If the customer does not recruit the key merchant during the time period and/or the key merchant does not convert to a participating merchant, the incentive may not be provided to the customer. As will be appreciated, a variety of customer and/or merchant incentives having different values, durations, etc., may be utilized with the implementations discussed herein to incent customer to recruit merchants and/or to incent eligible merchants to become participating merchants.

The implementations discussed herein of providing incentives to eligible merchants to convert to participating merchants and providing incentives to customers to recruit and encourage eligible merchants to convert to participating merchants provides many benefits over traditional techniques of acquiring merchants. For example, providing incentives to customers and merchants reduces acquisition cost and promotes customer engagement. Likewise, by allowing customers to select which eligible merchants to recruit, the selection of products and participating merchants is curated based on the preference of those customers. Other benefits are also realized.

Figure 6A:
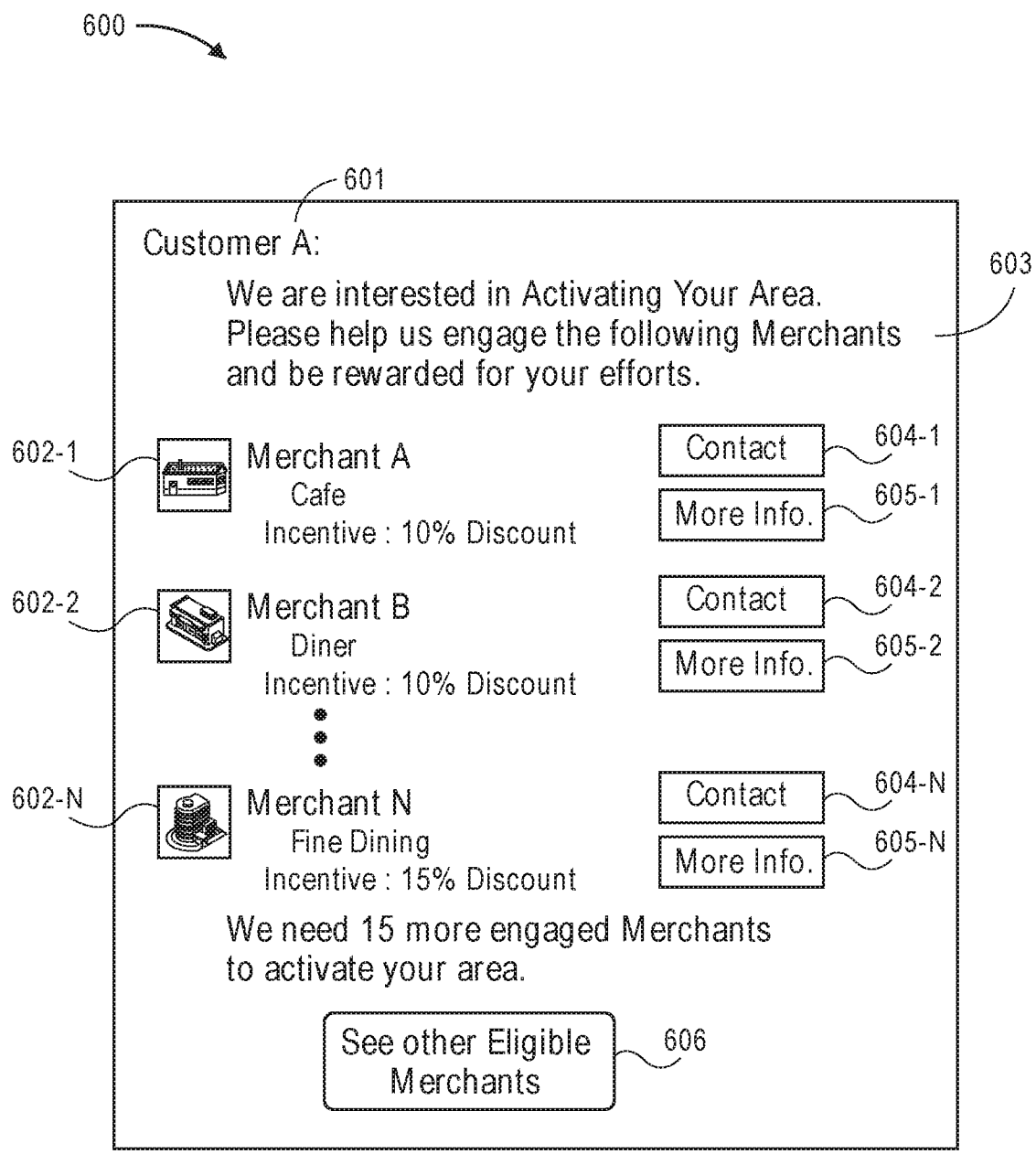
FIGS. 6A-6C are illustrations of notifications, in accordance with implementations of the present disclosure.
Figure 6B:
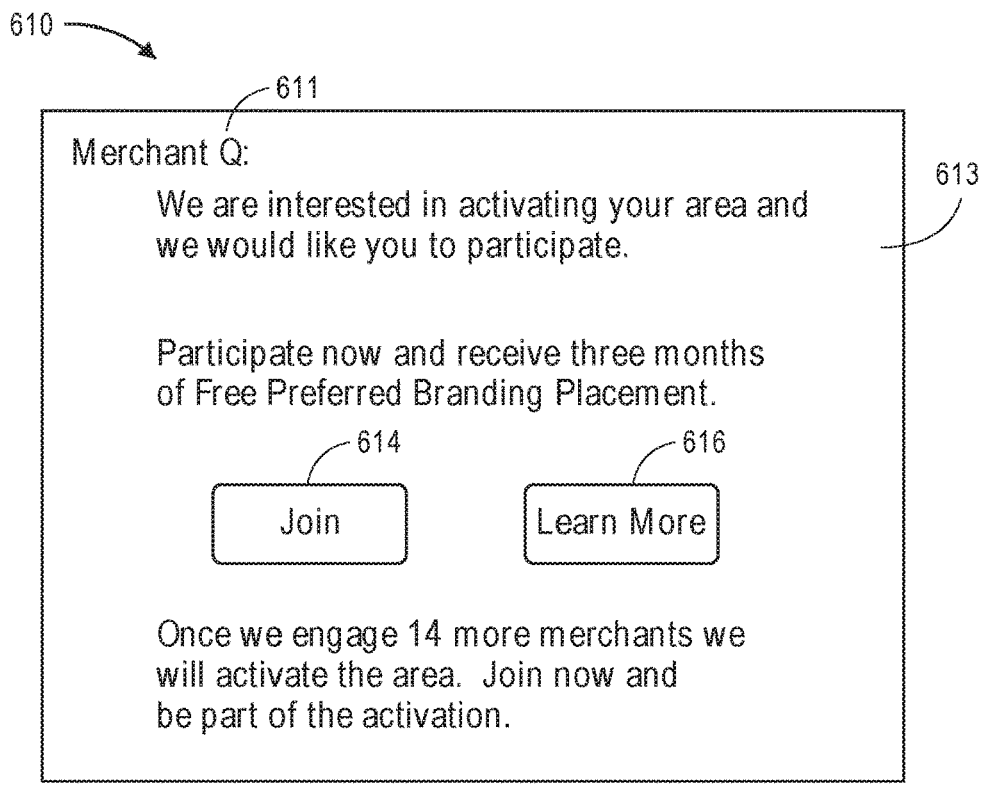
Figure 6C:
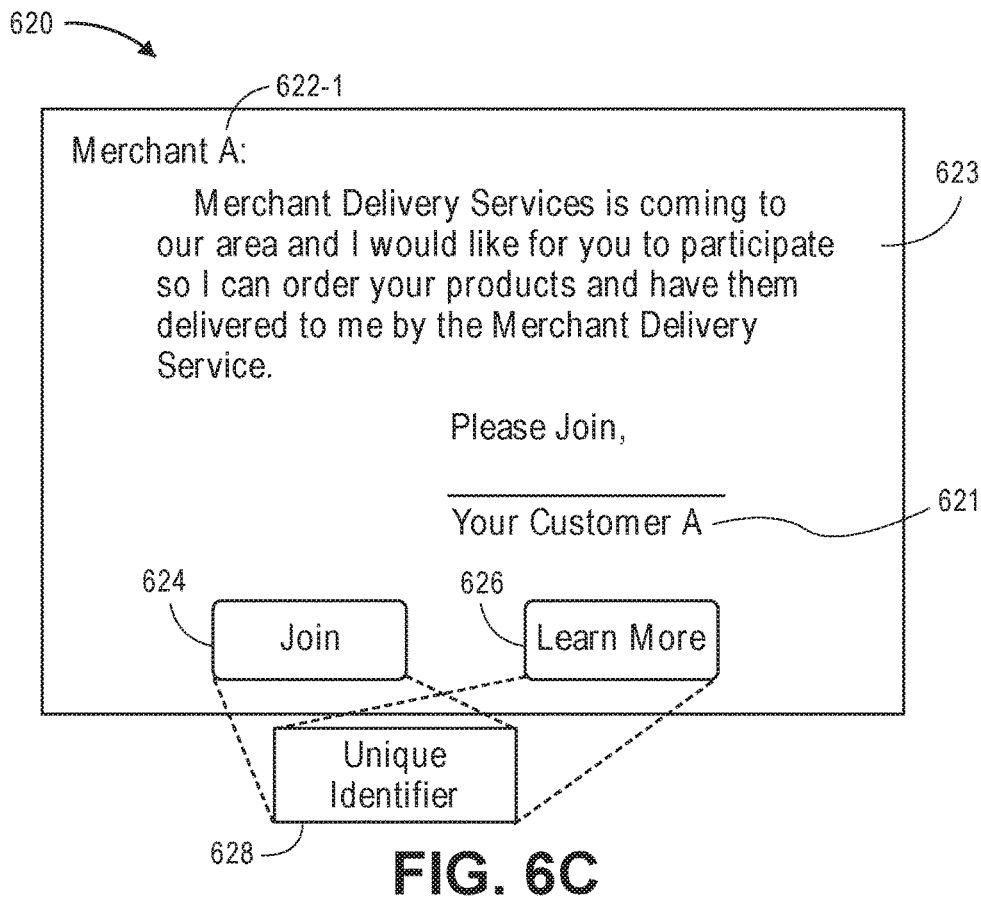

FIGS. 6A-6C are illustrations of notifications, in accordance with implementations of the present disclosure. First, referring to FIG. 6A, illustrated is an incentive notification 600 that may be sent to a customer, such as Customer A 601, to incent the customer to recruit eligible merchants to participate with the merchant delivery service. The notification may be sent as an electronic message, a web page presented to the customer, etc. The incentive notification 600 may include a message 603 to the customer informing the customer of the merchant delivery service's interest in providing service in the area of customer, and may identify one or more merchants 602. In this example, the incentive notification 600 identifies Merchant A 602-1, Merchant B 602-2, through Merchant N 602-N to the customer along with information about each eligible merchant. The additional information about each eligible merchant may include the category or categories associated with the eligible merchant, the customer incentive for the customer to recruit the eligible merchant, etc.

As discussed herein, as eligible merchants are determined for an area, one or more customers may be incented to recruit those eligible merchants to convert to participating merchants and participate with the merchant delivery service. In some implementations, the merchants identified to a customer may be based on knowledge of the customer, the customer's location within the area, the location of the eligible merchants, etc. For example, eligible merchants within a defined distance (e.g., five miles) of a customer may be identified in the incentive notification 600 to the customer 601. In another example, if the preferences of the customer are known (e.g., category preferences), eligible merchants matching those preferences may be included in the incentive notification 600 sent to the customer. In some examples, the customer may already be known to the merchant delivery service and thus, the preferences of the customer may be known. For example, the customer may live in one area that is already active and work in another area that is inactive. In such an example, category preferences, price preference, etc., may be determined for the customer based on the customer's behavior in the active area and that information may be utilized to identify merchants in the inactive area to suggest that the customer contact to recruit.

A customer 601 may interact with the incentive notification by selecting a Contact control 604 for one or more of the identified eligible merchants 602, selecting the More Info. control 605 for one or more of the identified eligible merchants 602, and/or selecting the See Other Eligible Merchants control 606. Upon selection of a contact control, such as Contact control 604-1 for Merchant A, Contact control 604-2 for Merchant B, or Contact control 604-N for Merchant N, the customer may be presented with a sample recruiting notification that the customer can complete and send to the selected eligible merchant. For example, FIG. 6C illustrates a recruiting notification 620 that is presented to Customer A 601 upon selection of the Contact control 604-1 in FIG. 6A. As illustrated, the recruiting notification 620 may include a message 623 to the merchant, in this example Merchant A 622-1, informing the merchant of the merchant delivery service and the customer's interest in the merchant participating with the merchant delivery service as a participating merchant. The recruiting notification 620 may also identify the customer, in this example Customer A 621, include a Join control 624 and/or a Learn More control 626.

The customer may modify and/or add to the recruiting notification 620 and then select to send the recruiting notification to the selected merchant. The recruiting notification may be sent as an electronic message, a web page, an application interface, etc.

Figure 8:
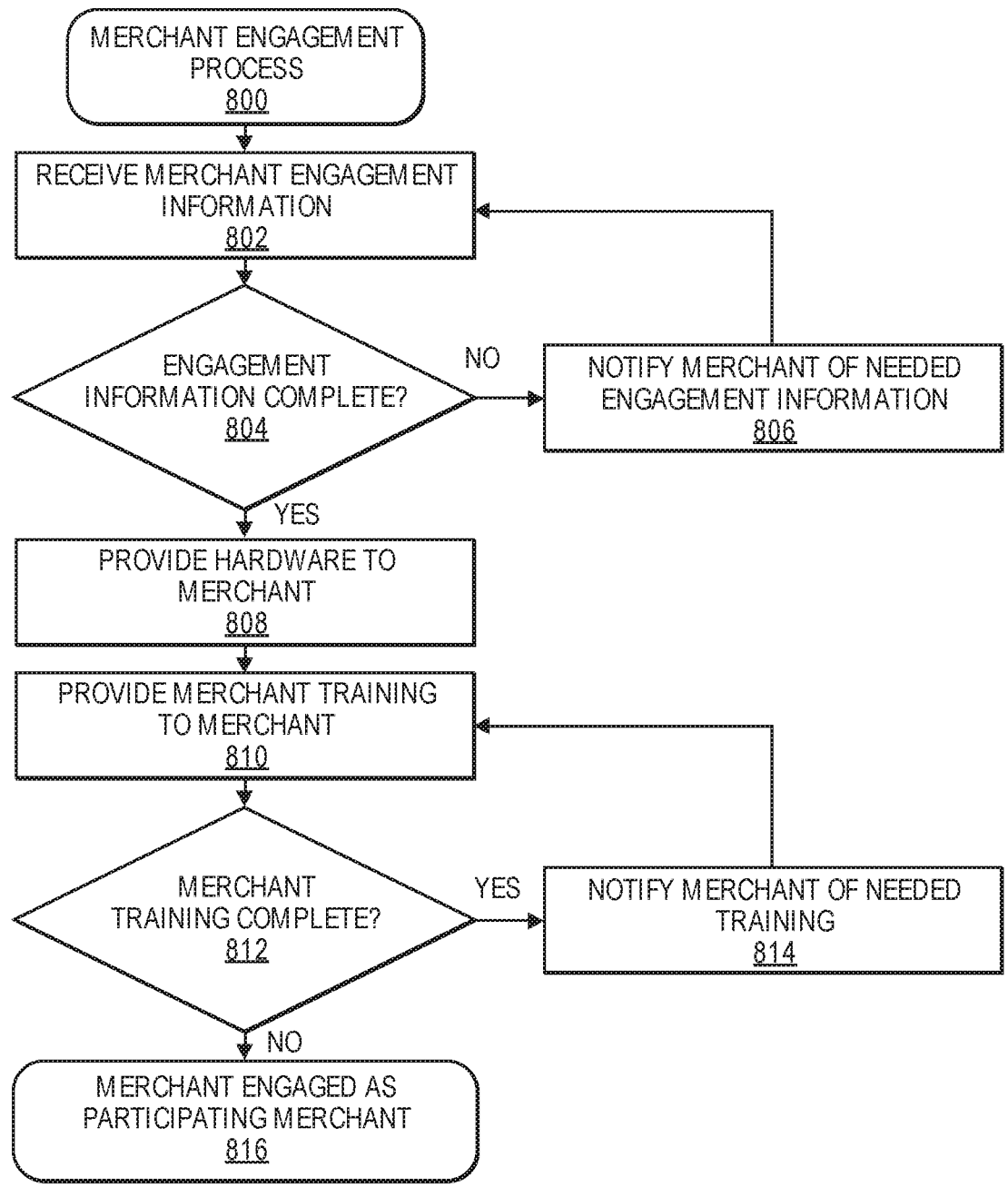
FIG. 8 is a flow diagram of an example merchant engagement process, in accordance with implementations of the present disclosure.

The merchant, upon receipt of the notification 620 from the customer, may view the notification and interact with the controls 624 and/or 626. If the merchant selects the Join control, the merchant is routed to an interface of the merchant delivery service that facilitates conversion of the eligible merchant to a participating merchant. Conversion may include, among other things, providing by the eligible merchant to the merchant delivery service merchant information such as banking information, payment information, product information, etc. The merchant may also be required to complete one or more agreements between the merchant delivery service and the eligible merchant to participate in the merchant delivery service, etc. FIG. 8 provides additional discussion relating to conversion of an eligible merchant to a participating merchant.

Selection of the Learn More control 626 by the merchant 622-1 will result in additional information about the merchant delivery service being provided to the merchant 622-1. Additional information may include, for example, an indication of the terms and conditions necessary to become a participating merchant, an indication of other participating merchants in the area, an indication of the number of potential customers that may use the merchant delivery service to order products from the merchant, etc.

Upon selection of the Join control 624 and/or the Learn More control 626 by the merchant, a unique identifier 628 associated with at least one of the merchant 622-1 or the customer 621 that sent the recruiting notification 620 to the merchant is sent to the merchant delivery service as confirmation that the customer 621 contacted the eligible merchant 622-1 to recruit the merchant to participate with the merchant delivery service as a participating merchant.

As discussed herein, the unique identifier 628 may be used by the merchant delivery service to determine which customers were involved in recruiting an eligible merchant and converting the eligible merchant to a participating merchant. Likewise, the unique identifier 628 may likewise be used by the merchant delivery service to determine how many recruiting contacts have been made by a customer, how many times a merchant has been contacted by the same or different customers, the conversion rate for a customer, the average number of customer contacts necessary to convert an eligible merchant to a participating merchant, etc. While in this example, the unique identifier is provided to the merchant via the recruiting notification and then provided by the merchant to the merchant delivery service in response to the merchant interacting with the recruiting notification, in other implementations, recruiting information between merchants and customers and/or the unique identifier may be shared or transmitted in other ways. For example, as discussed above, the merchant may identify the customer(s) that recruited them, the customer may identify the merchant(s) they contacted to recruit, a customer and/or merchant may utilize a mobile device and/or software application operating on a mobile device (e.g., tablet, smart phone, wearable, laptop) while at the location of the merchant to verify that the customer has contacted the merchant to recruit the merchant, etc.

Returning to FIG. 6A, if the customer selects a More Info. control, such as More Info. control 605-1 for Merchant A, More Info. control 605-2 for Merchant B, or More Info. control 605-N for Merchant N, the customer is provided with additional information about the respective merchant. Additional information may include, for example, the number of available contacts for the merchant, when a first recruiting contact was made, etc. Examples of additional information about an eligible merchant are discussed above with respect to FIG. 3.

If the customer selects the See Other Eligible Merchants control 606, the user may be presented with information relating to other eligible merchants within the area. Like the eligible merchants indicated in the notification, the user may obtain additional information about those merchants and/or request to contact those merchants.

FIG. 6B illustrates an incentive notification 610 that may be generated by the merchant delivery service and sent to an eligible merchant to incent the eligible merchant to participate with the merchant delivery service as a participating merchant. Similar to the incentive notification illustrated in FIG. 6A, the incentive notification 610 may identify the merchant, in this example Merchant Q 611, include a message 613 informing the merchant about the merchant delivery service, the interest in the merchant delivery service to have the eligible merchant join as a participating merchant, and an indication of the incentive offered to the eligible merchant to incent the eligible merchant to join the merchant delivery service. The message may also identify the number of existing participating merchants in the area, the number of participating merchants needed before the area is activated, etc. Likewise, the incentive notification 610 may also include a Join control 614 and/or a Learn More control 616 that may be selected by the merchant to obtain additional information about the merchant delivery service and/or to join the merchant delivery service as a participating merchant.

Figure 7:
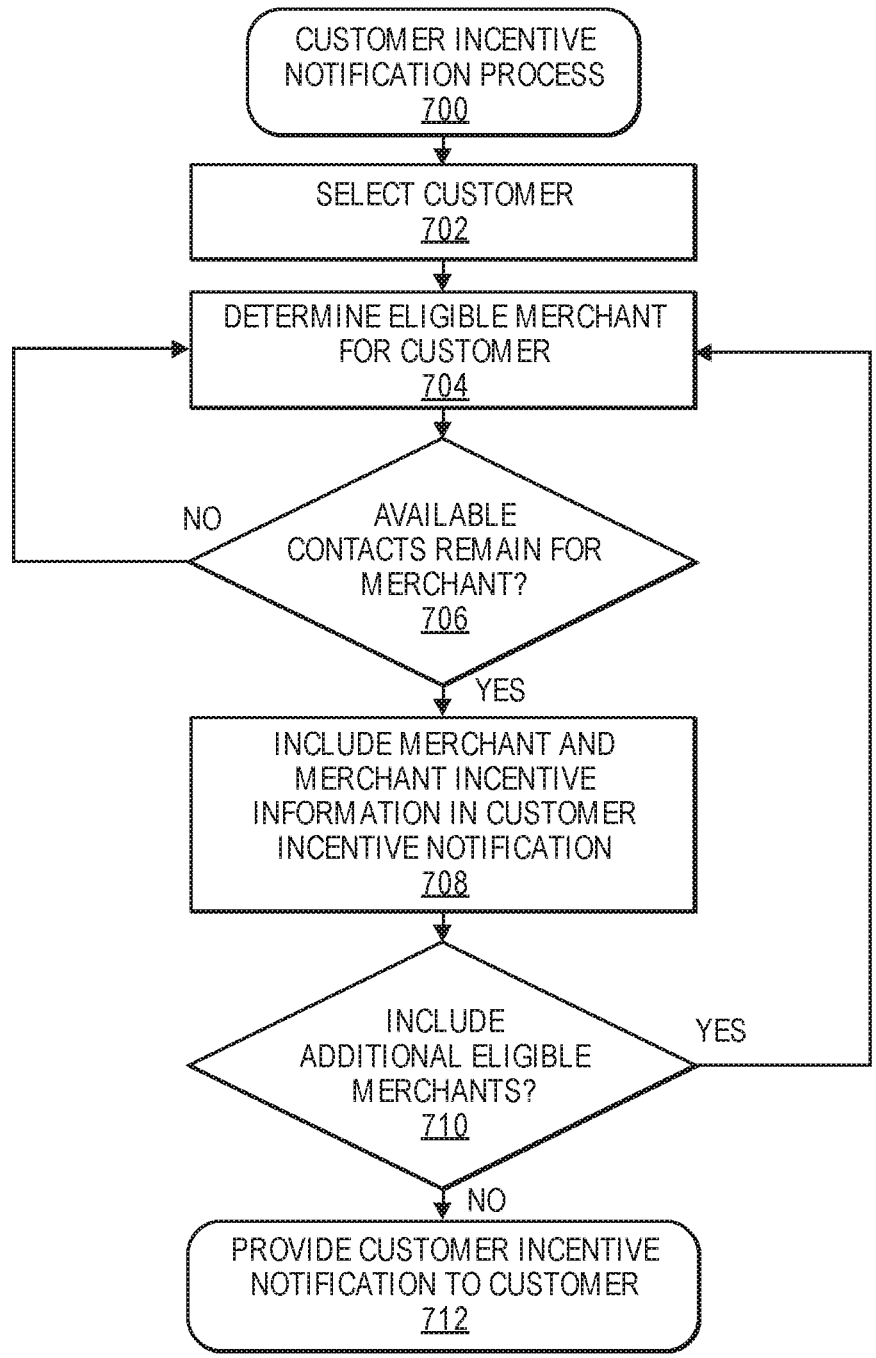
FIG. 7 is a flow diagram of an example customer incentive notification process, in accordance with implementations of the present disclosure.

FIG. 7 is a flow diagram of an example customer incentive notification process 700, in accordance with implementations of the present disclosure. The example process 700 begins by selecting a customer, as in 702. A customer may be a customer that is located within, lives within, and/or has a delivery location within an area. For example, a customer may be a person that lives within an area, a person that works in a location within the area, etc. In other examples, a customer may be another merchant or other business within an area. For example, in some implementations, participating merchants may be selected as customers and incented to recruit other eligible merchants to convert to participating merchants. Existing participating merchants may be interested in recruiting other eligible merchants to achieve the minimum number of participating merchants to activate the merchant delivery service within the area, to increase customer selection, to increase customer volume, etc.

Upon selection of a customer, an eligible merchant within the area is determined for the customer, as in 704. An eligible merchant for a customer may be determined based on a variety of factors. For example, an eligible merchant within a defined distance of the customer's location may be determined for the customer, an eligible merchant that is frequented by the customer may be determined for the customer, an eligible merchant associated a category preferred by the customer may be selected, an eligible merchant may be selected for the customer based on a number of other customer contacts with the eligible merchant, an eligible merchant may be randomly selected for the customer, an eligible merchant may be selected based on an average price of the merchant products, etc. Any combination of one or more factors may be used to select an eligible merchant for a customer.

Upon determination of an eligible merchant, a determination is made as to whether available contacts remain for the eligible merchant, as in 706. As discussed above, in some implementations, a number of customers that may contact a merchant to recruit the merchant during a period of time may be limited. Limiting recruiting contacts may be beneficial to control a cost of incentives when the eligible merchant converts to a participating merchant and to reduce any annoyance by the eligible merchant from multiple recruiting contacts.

If it is determined that no contacts remain for the determined eligible merchant, the example process returns to block 704 and continues by determining another eligible merchant for the customer. If it is determined that a contact remains for the determined eligible merchant, an identification of the eligible merchant and a corresponding customer incentive is included in a customer incentive notification to be sent to the customer, as in 708. As discussed above, various customer incentives may be determined for different merchants. Likewise, in some implementations, those incentives may vary not only based on the merchants but also based on the customer that is being incented to recruit the eligible merchant. For example, if the customer has a reputation of consistently recruiting and converting eligible merchants to participating merchants, the customer incentive for one or more merchants may be increased for that customer.

Upon including a determined eligible merchant and corresponding customer incentive information for that merchant in a customer incentive notification, a determination is made as to whether additional eligible merchants are to be identified in the customer incentive notification for the customer, as in 710. Determining whether to include additional eligible merchants in a customer incentive notification may vary based on the number of eligible merchants, the number of participating merchants, the number of recruiting contacts made by the customer that have not yet resulted in conversions of eligible merchants to participating merchants, the number of recruiting contacts made by the customer that have resulted in conversions of eligible merchants to participating merchants, etc.

If it is determined that additional eligible merchants and corresponding customer incentive information is to be included in the incentive notification for the customer, the example process returns to block 704 and continues by determining another eligible merchant. If it is determined that no additional eligible merchants are to be identified in the customer incentive notification, the customer incentive notification is provided to the customer to incent the customer to recruit the eligible merchants to participate in the merchant delivery service, as in 712. An example customer incentive notification is discussed above and illustrated in FIG. 6A.

FIG. 8 is a flow diagram of an example merchant engagement process 800, in accordance with implementations of the present disclosure. The example process 800 begins upon receipt of merchant engagement information, as in 802. Merchant engagement information may include information determined necessary by the merchant delivery service for a merchant to become a participating merchant and participate with the merchant delivery service. For example, merchant engagement information may include, but is not limited to, payment information, acceptance of the merchant delivery service's terms and conditions, product information, merchant address, hours of operation, etc. In some implementations, the merchant engagement information may be provided by the merchant as part of a self-service on-line tool that guides the merchant through the process of collecting, providing, and/or agreeing to the merchant engagement information.

Upon receipt of the merchant engagement information, a determination is made as to whether the provided merchant engagement information is complete, as in 804. If the merchant is providing the merchant engagement information using a self-service tool, the tool may monitor collection of information and determine when all information has been provided. It may be determined that all merchant engagement information has been provided when the tool determines that all materials have been received. In other implementations, upon a determination that all materials have been received, the self-service tool may notify an agent of the merchant delivery service to review the provided materials to determine if the materials are complete.

If it is determined that the merchant engagement information is not complete, the example process notifies the merchant of the need for additional merchant engagement information, as in 806, and the example process 800 returns to block 802. If it is determined that the provided merchant engagement information is complete, hardware needed to interface and/or interact with the merchant delivery service may be provided to the merchant, as in 808. Hardware may include, for example, a computer, laptop, tablet, wearable, notebook, a voice activated and/or voice controlled device, and/or other device that can establish a wired and/or wireless connection with a network, such as the Internet, and exchange information with computing devices of the merchant delivery service. In some implementations, provisioning of hardware may be optional and the merchant may be able to interact with and communicate with the merchant delivery service using existing hardware, such as an existing computer, tablet, laptop, etc.

The example process may also include providing of training to the merchant, as in 810, to train the merchant how to interact and work with the merchant delivery service. For example, the training may educate the merchant how to receive orders from the merchant delivery service, how to schedule or request delivery or an ordered product, how to receive payment for a product, how to pay the merchant delivery service, how to receive payment from the merchant delivery service, etc. In some implementations, the training may be provided by an agent of the merchant delivery service. In other implementations, some or all of the training may be provided over a network in the form of video and/or audio based training and/or interactive tutorials.

Returning to the example process 800, a determination is made as to whether merchant training has been completed by the merchant, as in 812. In implementations that utilize video and/or audio based training and/or interactive tutorials, when viewing of the material has been completed, the training may be considered complete. In implementations that utilize agent based training, training may be considered complete when the agent indicates to the example process 800 that the merchant training has completed.

If it is determined that the merchant training has not been completed, the merchant is notified of the needed merchant training that remains, as in 814. Likewise, the example process 800 returns to block 810 and continues. If it is determined that the merchant training has been completed, the merchant is engaged by the merchant delivery service and the merchant becomes a participating merchant, as in 816. When the area serviced by the merchant becomes active, the participating merchant will be able to have customer ordered products delivered to customers by the merchant delivery service.

Figure 9:
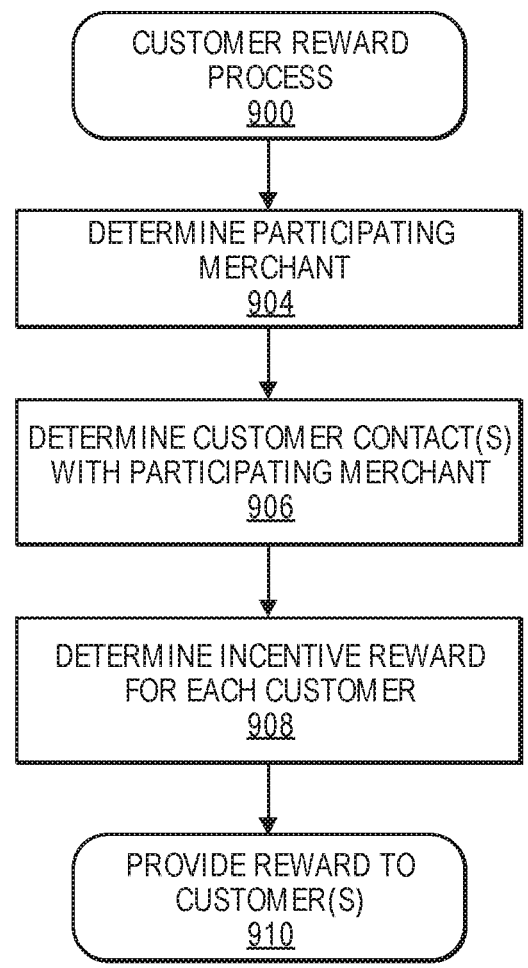
FIG. 9 is a flow diagram of an example customer reward process, in accordance with implementations of the present disclosure.

FIG. 9 is a flow diagram of an example customer reward process 900, in accordance with implementations of the present disclosure. The example process begins by determining a merchant that has converted from an eligible merchant to a participating merchant, as in 904. Conversion of an eligible merchant to a participating merchant is discussed above, for example, with respect to FIG. 8.

For the determined participating merchant, the customer or customers that contacted the participating merchant to recruit the merchant to become a participating merchant are determined, as in 906. As discussed above, customers that contacted the merchant may be determined based on a unique identifier originally provided to the customer, that was then forwarded to the merchant and then sent by the merchant to the merchant delivery service. In other implementations, customers that contacted the participating merchant may be determined based on other information received from the participating merchant, based on information received from the customers, based on information received from a customer device, based on information received from a merchant device, etc.

For each customer determined to have contacted the participating merchant to recruit the merchant to become a participating merchant, the incentive reward promised to that customer for the recruiting contact is determined, as in 908. As discussed herein, the merchant delivery service may maintain customer incentive information provided to each customer for each merchant in one or more data stores. When an eligible merchant converts to a participating merchant, the incentive information for each recruiting customer may be determined from the stored information. Finally, the incentive is provided to the customer as a reward or recognition for successfully recruiting the merchant and assisting in conversion of the merchant from an eligible merchant to a participating merchant, as in 910. As discussed above, the incentive may be provided by the merchant delivery service and/or by one or more third parties. If the incentive is provided by one or more third parties other than the merchant delivery service, the example process 900 may include enabling provisioning of the incentive to the customer(s). For example, if the incentives are provided by a third party, the example process 900 may enable provisioning of the incentives by providing a notification to the third party indicating the incentives to be provided and/or the customer(s) that are to receive the incentives. Enabling provisioning of the incentives to customers includes the merchant delivery service directly providing the incentives and/or one or more third parties providing the incentives to the customer(s).

While the example 900 describes providing the incentives in the form of a reward to customers after an eligible merchant has been converted to a participating merchant, in some implementations, customer rewards may be provided at other times. For example, in some implementations, once an eligible merchant begins the engagement process 800 (FIG. 8) to convert from an eligible merchant to a participating merchant the example process 900 may be performed and recruiting customers rewarded as a result of the merchant starting the process to convert from an eligible merchant to a participating merchant. In other examples, customers may be rewarded for recruiting an eligible merchant upon determination that the customer has contacted the eligible merchant to recruit the eligible merchant. For example, referring back to FIG. 6C, if the merchant delivery service receives a unique identifier in response to an eligible merchant selecting the Join control 624 or selecting the Learn More control 626, the customer that contacted the merchant to recruit the merchant may be rewarded with the incentive for that contact, regardless of whether the eligible merchant converts to a participating merchant.

Figure 10:
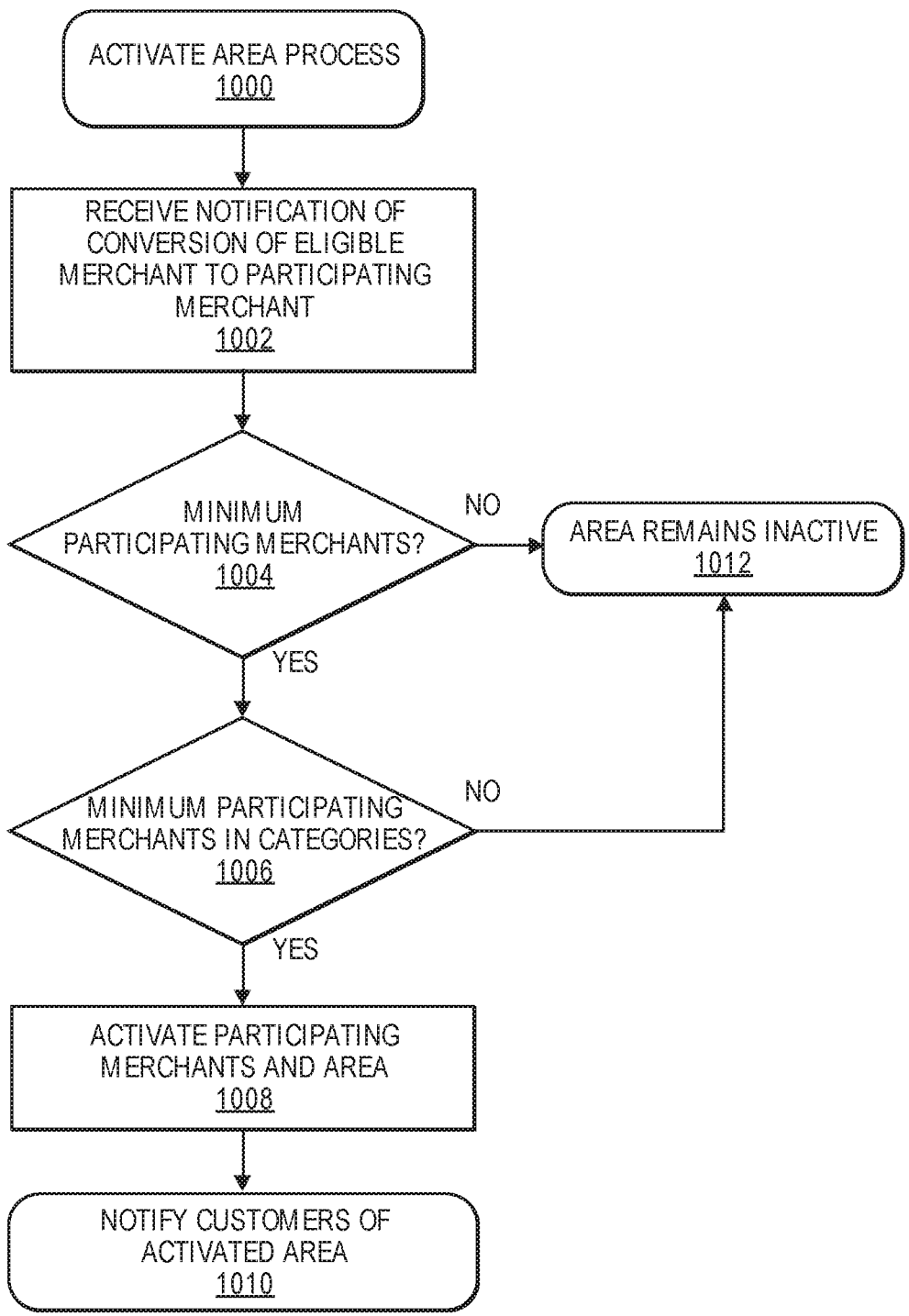
FIG. 10 is a flow diagram of an example process for activating an area to enable delivery of products by the merchant delivery service within the area, in accordance with implementations of the present disclosure.

FIG. 10 is a flow diagram of an example process 1000 for activating an area to enable delivery of products by the merchant delivery service within the area, in accordance with implementations of the present disclosure. The example process 1000 begins when a notification of an eligible merchant within an area is converted to a participating merchant, as in 1002. Upon addition to a participating merchant for the area, a determination is made as to whether the minimum number of participating merchants for an area has been satisfied, as in 1004. If it is determined that the minimum number of participating merchants for the area has not been satisfied, the area remains inactive, as in 1012.

However, if it is determined that the minimum number of participating merchants has been achieved with the addition of the participating merchant, an optional determination may be made as to whether a minimum number of participating merchants in the categories for the area has been achieved, as in 1006. In some implementations, a minimum number of participating merchants in each category may be necessary before the area is activated. As such, if the minimum number of participating merchants within a category has not been achieved the area remains inactive, as in 1012. Alternatively, the area may be activated but some of the categories may be withheld until a minimum number of participating merchants associated with that category has joined the merchant delivery service. In some implementations, there may be one or more critical categories in which a minimum number of merchants are necessary before the area is activated.

Upon determination that the minimum number of participating merchants for the area has been achieved and optionally the minimum number of participating merchants within a category has been achieved, the participating merchants and the area are activated such that orders for products from those participating merchants may be placed for delivery to a customer location within the area by the merchant delivery service, as in 1008. Activation of the participating merchants and the area may include making a web page or other interface accessible to customers, similar to the web page discussed above with respect to FIG. 1, so that customers may view information about participating merchants within the area and/or order products from merchants within the area for delivery by the merchant delivery service.

In addition to activating the participating merchants and the area, a notification may be sent to customers within the area informing the customers that the area is now active for delivery of products ordered from participating merchants for delivery by the merchant delivery service, as in 1010. The notification to the customers may be in the form of an electronic message, such as e-mail, text message, short message, social message, etc. In other implementations, the notification to the customer may be provided by other means.

Figure 11:
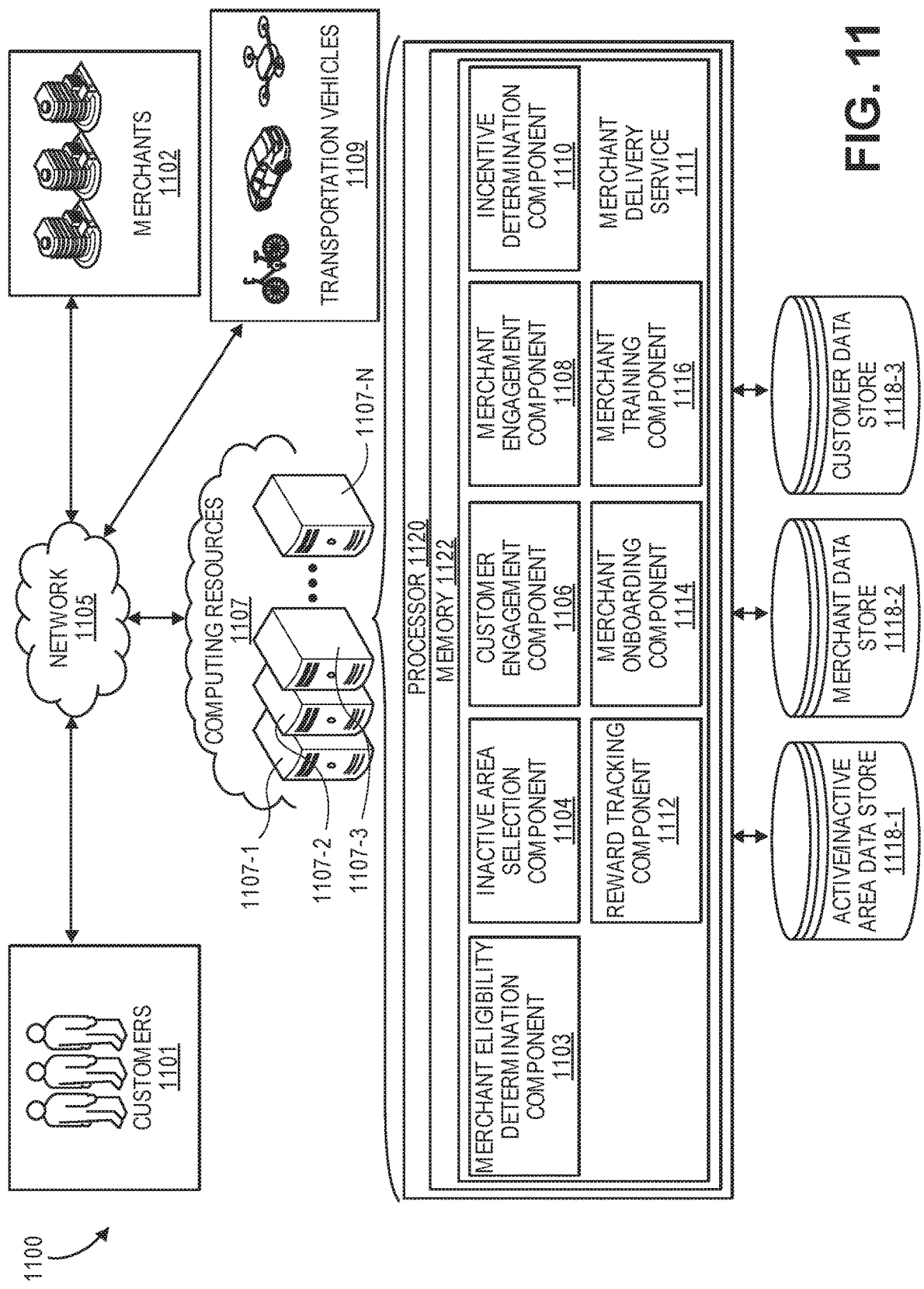
FIG. 11 is a block diagram of components of one system for activating areas for a merchant delivery service, in accordance with implementations of the present disclosure.

FIG. 11 is a block diagram of components of one system for activating areas for a merchant delivery service, in accordance with implementations of the present disclosure. As shown in FIG. 11, the system 1100 includes customers 1101, merchants 1102, a merchant delivery service 1111, and transportation vehicles 1109 that are connected to one another across a network 1105, such as the Internet.

The merchants 1102 may be any entity or individual that wishes to make products (e.g., food, clothing, toys, games, decorations, art) available for order by customers 1101 and delivery by one or more transportation vehicles 1109 of the merchant delivery service 1111. Ordered products may be purchased, leased, rented, borrowed, loaned, traded, etc. The products are made available for order by the customers 1101 using a networked computer infrastructure, including one or more physical computer servers and data store (or databases) for hosting a web site or other interface that makes products from merchants 1102 available for selection and ordering by customers 1101. The web site or other interface may be implemented using the one or more servers, which connect or otherwise communicate with the one or more databases, the merchants 1102, the customers 1101, the transportation vehicles 1109, the merchant delivery service 1111, as well as the network 1105, through the sending and receiving of digital data. Moreover, the data stores, as discussed further below, may include any type of information regarding products, customers, merchants, areas, etc.

The customers 1101 may be any person or entity that desires to have a product from a merchant delivered to a location within an area serviced or possibly in the future serviced by the merchant delivery service. For example, a customer may be a person that lives in the area and/or a person that is located in the area (e.g., works in the area, is visiting the area). In some instances, a merchant may also be a customer of another merchant.

The customer 1101 and/or merchant 1102 may utilize one or more computing devices, such as a tablet, laptop, desktop, smartphone, wearable, etc., to operate or access one or more software applications, such as a web browser as illustrated in FIG. 1, an order page, etc., and may be connected to or otherwise communicate with the merchant delivery service 1111. Moreover, the customer 1101 may also receive order confirmations, delivery updates, etc., from the merchant delivery service and/or from merchants via the computing device. Likewise, merchants 1102 may receive customer orders for products, schedule product pickup, interact with the customers and/or the merchant delivery service 1111 via the network using the computing devices.

The merchant delivery service 1111 may operate on one or more remote computing resources 1107. The remote computing resources 1107 may form a portion of a network-accessible computing platform implemented as a computing infrastructure of processors, storage, software, data access, and other components that is maintained and accessible via the network 1105. Services, such as the merchant delivery service 1111 offered by the remote computing resources 1107, do not require that the customer and/or merchant have knowledge of the physical location and configuration of the system that delivers the services. Customers 1101 and/or the merchants 1102 may utilize one or more computing devices, such as computers, laptops, tablets, smartphones, and/or other hardware or software to communicatively couple to the remote computing resources 1107 via the network 1105 which may represent wired technologies (e.g., wires, USB, fiber optic cable, etc.), wireless technologies (e.g., RF, cellular, satellite, Bluetooth, etc.), and/or other connection technologies. Likewise, the transportation vehicles 1109 and/or operators of the transportation vehicles may be configured or capable of communicating with the remote computing resources 1107 via the network 1105. The network 1105 carries data between the customers 1101, merchants 1102, transportation vehicles 1109, and the remote computing resources 1107. For example, the network 1105 may carry data representative of an order by a customer 1101 for a product available from a merchant 1102 for delivery by the merchant delivery service 1103 using one of the transportation vehicles 1109.

As illustrated, the remote computing resources 1107 may include one or more servers, such as servers 1107-1, 1107-2, 1107-3 . . . 1107-N. These servers 1107-1-1107-N may be arranged in any number of ways, such as server farms, stacks, and the like that are commonly used in data centers. Furthermore, the servers 1107-1-1107-N may include one or more processors 1120 and memory 1122 which may store the merchant delivery service 1111 and execute one or more of the processes or features discussed herein.

The merchant delivery service may include one or more components that operate to perform one or more of the processes or features described herein. For example, the merchant delivery service 1111 may include a merchant eligibility determination component 1103, an inactive area selection component 1104, a customer engagement component 1106, a merchant engagement component 1108, an incentive determination component 1110, a reward tracking component 1112, a merchant onboarding component 1114, and/or a merchant training component 1116. Each of the components of the merchant delivery service may be configured to communicate with one or more other components of the merchant delivery service, the customers 1101, the merchants 1102, and/or the transportation vehicles 1109. Likewise, one or more of the components of the merchant delivery service 1111 may be configured to store and/or access one or more of the active/inactive area data store 1118-1, the merchant data store 1118-2, and/or the customer data store 1118-3.

The merchant eligibility determination component 1103 of the merchant delivery service may be configured to process merchants within an area and determine if the merchants satisfy one or more minimum requirements to be eligible to participate with the merchant delivery service as a participating merchant. In one implementation, the merchant eligibility determination component 1103 may be configured to perform the example process 400 (FIG. 4) and as merchants are processed, information corresponding to each merchant may be stored and/or updated in the merchant data store 1118-2 by the merchant eligibility determination component 1103 for the processed merchants. The stored merchant information maintained in the merchant data store 1118-2 may include, but is not limited to, merchant identifying information (e.g., name, location, contact information), hours of operation, product information (e.g., menus), pricing, ratings, areas of service, eligibility, etc.

The inactive area selection component 1104 may be configured to periodically process and consider a plurality of inactive areas and determine which of those inactive areas have a higher priority for conversion to an active area. For example, the inactive area selection component may determine the number of customers within each inactive area, the number of eligible merchants within each inactive area, the demographics of each inactive area, etc., and determine which inactive area should be pursued by the merchant delivery service for conversion to an active area. As inactive areas are processed, information about each area may be stored and/or updated in the active/inactive area data store 1118-1 by the inactive area selection component 1104. Likewise, upon selection of an inactive area with a highest priority, the inactive area selection component may notify the customer engagement component 1106 and/or merchant engagement component 1108 of the inactive area to be pursued for conversion to an active area.

The customer engagement component 1106 and merchant engagement component 1108 may be configured to determine customers and merchants within a selected area to provide incentives to and to communicate with those merchants and/or customers. For example, the customer engagement component may access the customer data store 1118-3 to determine customers within a selected area, and determine customer information about those customers to determine which customers the customer incentive notifications are to be delivered to incent those customers to recruit eligible merchants within the area. Likewise, in some implementations, the customer engagement component may receive from the merchant engagement component an indication of eligible merchants and determine which merchants to identify to which customers. An example process that may be performed by the merchant engagement component 1106 is illustrated and discussed above with respect to FIG. 5 and an example customer incentive notification that may be generated by the customer engagement component 1106 is discussed above and illustrated in FIG. 6A.

In a similar manner, the merchant engagement component 1108 may access the merchant data store 1118-2 to determine merchants within the area and to utilize information determined by the merchant eligibility determination component 1103 to determine which merchants within the area are eligible merchants for which an incentive is to be provided to incent the merchant to participate with the merchant delivery service. Likewise, the merchant engagement component may generate and send merchant incentive notifications, such as the merchant incentive notification 610 discussed above and illustrated in FIG. 6B.

The incentive determination component 1110 may communicate with each of the customer engagement component 1106 and the merchant engagement component 1108 to determine incentives to present to merchants and/or customers to incent the merchants to participate and/or to incent the customers to recruit eligible merchants to participate with the merchant delivery service 1111. In determining incentives for merchants, the incentive determination component may access the merchant data store to obtain information about eligible merchants. Likewise, as merchant incentives are determined, the incentives promised to each respective merchant may be stored by the incentive determination component in the merchant data store 1118-2 and associated with the respective merchant. An example incentive determination process 500 is discussed above and illustrated in FIG. 5.

In a similar manner, the incentive determination component may access the customer data store 1118-3 and/or the merchant data store 1118-2 to determine incentives to provide to different customers for different merchants to incent those customers to recruit eligible merchants. Likewise, as incentives are promised to different customers for different merchants, the customer data store 1118-3 and/or the merchant data store 1118-2 may be updated to store the promised incentive information for each customer and corresponding eligible merchant.

The reward tracking component 1112 is configured to determine incentive rewards to provide to customers in response to a conversion of an eligible merchant to a participating merchant. In other implementations, as discussed above, incentive rewards may be provided at times other than conversion of an eligible merchant to a participating merchant. For example, a customer incentive reward may be provided to a customer in response to a notification by the merchant onboarding component 1114 that a merchant has begun or completed an onboarding process, such as the example process 800 (FIG. 8). In another example, the reward tracking component 1112 may provide an incentive reward in response to a notification from the merchant training component indicating that a merchant has completed the training necessary to become a participating merchant. As customer rewards are determined, the customer data store 1118-3 may be updated to indicate the rewards for each customer. An example customer reward process 900 is discussed above and illustrated in FIG. 9.

In addition to tracking and providing customer rewards to customers by the reward tracking component 1112, the reward tracking component 1112 may also track and determine rewards for merchants. For example, when an eligible merchant converts to a participating merchant the reward tracking component may access the merchant data store to determine the incentive promised to the merchant and reward the merchant with that incentive. The reward may be associated with the merchant and stored in the merchant data store 1118-2.

Finally, the merchant onboarding component 1114 and the merchant training component 1118 are configured to assist the merchants in conversion from an eligible merchant to a participating merchant. For example, the merchant onboarding component 1114 may perform a portion of the example process 800 (FIG. 8) and provide the self-service tool that enables the merchant to submit the merchant engagement information necessary for an eligible merchant to become a participating merchant. As merchant engagement information is received, the merchant onboarding component may store the information in the merchant data store 1118-2 and update a status indicating whether the merchant has submitted all the necessary merchant engagement information. In some implementations, when the merchant onboarding component 1114 determines that all merchant engagement information has been provided, the received information may be provided to an agent of the merchant delivery service for processing and to determine if the merchant engagement information is complete. In other examples, the merchant onboarding component 1114 may process the received information and determine if the information is complete.

The merchant training component 1116 may perform another portion of the example process 800 (FIG. 8) and provide training to the merchant. For example, the merchant training component 1116 may provide audio, video, and/or interactive training to merchants to educate the merchants regarding the operation of the merchant delivery service.

As will be appreciated, additional or fewer components may be included in the example merchant delivery service 1111 and the ones discussed herein are provided as examples and for discussion purposes only. For example, in some implementations, the merchant delivery service may also include an ordering component that manages customer orders, a transportation management component that coordinates movement and delivery of transportation vehicles 1109, and/or a payment component that manages payment for the management delivery service by the participating merchants. Likewise, in other implementations some or all of the components may be combined into a single component.

The transportation vehicles 1109 may include any type of vehicle capable of transporting an ordered product from a merchant to a customer specified location. For example, transportation vehicles may include humans, human powered vehicles (e.g., bicycles, skate boards), human operated or controlled vehicles (e.g., human operated or controlled ground based vehicles, human operated or controlled water based vehicles, and human operated or controlled aerial vehicles), autonomous vehicles (e.g., autonomous ground based vehicles, autonomous water based vehicles, and autonomous aerial vehicles), etc., to facilitate transport of products from active merchants to customers.

The transportation vehicles and/or the operators of the transportation vehicles may be configured to communicate with the merchant delivery service to receive navigation and/or routing instructions. In some implementations, the transportation vehicles may include one or more computer processors, and sensors such as a cellular telephone transceiver, a GPS receiver or sensor, an accelerometer, a gyroscope or a compass, or any other sensors or components for determining positions, velocities, accelerations or orientations of the transportation vehicle 1109. The position, velocity, etc., of the transportation vehicles may be transmitted over the network 1105 to the merchant delivery service and a component of the merchant delivery service may coordinate routing of the transportation vehicles so that ordered products are routed between merchants and customers.

The computers, servers, devices, computing resources and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device or method to interact with the computers, servers, devices and the like, or to "select" a control, link, node, hub or any other aspect of the present disclosure.

Those of ordinary skill in the pertinent arts will understand that process steps described herein as being performed by a "merchant delivery service," a "customer," an "eligible merchant," a "participating merchant," an "active merchant, a "transportation vehicle," or like terms, may be automated steps performed by their respective computer systems, or implemented within software modules (or computer programs) executed by one or more general purpose computers.

The merchant delivery service, customers, merchants, and/or transportation vehicles may use any web-enabled or Internet applications or features, or any other client-server applications or features including electronic mail (or E-mail), or other messaging techniques, to connect to the network 1105 or to communicate with one another, such as through short or multimedia messaging service (SMS or MMS) text messages. For example, a merchant 1102 may include computing hardware, such as a tablet, adapted to transmit information or data in the form of synchronous or asynchronous messages to the computing resources 1107 in real time or in near-real time, or in one or more offline processes, via the network 1105. Those of ordinary skill in the pertinent art would recognize that the customers 1101, merchants 1102, merchant delivery service 1111 operating on the remote computing resources 1107, and/or the transportation vehicles 1109 may operate any of a number of computing devices that are capable of communicating over the network, including but not limited to set-top boxes, personal digital assistants, digital media players, web pads, laptop computers, desktop computers, electronic book readers, tablets, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the computing resources 1107 or any other computers or control systems utilized by the merchant delivery service 1111, customers 1101, merchants 1102, and/or transportation vehicles 1109 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4, 5, and 7-10, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   determining, by a merchant delivery service executing on one or more computing resources, an area to activate the merchant delivery service in which the merchant delivery service causes delivery of products to customers on behalf of participating merchants;
   determining, by the merchant delivery service, that a number of participating merchants within a range of the area does not exceed a threshold;
   determining, by the merchant delivery service, a plurality of eligible merchants in the area, each of the plurality of eligible merchants satisfying a requirement;
   determining, by the merchant delivery service, for an eligible merchant of the plurality of eligible merchants, and based at least in part on the determination that the number of participating merchants within the range of the area does not exceed the threshold, an incentive to provide to a customer of the merchant delivery service to incent the customer to recruit the eligible merchant to participate with the merchant delivery service and allow the merchant delivery service to cause delivery of products on behalf of the eligible merchant;
   sending, by the merchant delivery service, a notification to the customer indicating the eligible merchant and the incentive;
   receiving, by the merchant delivery service and from a mobile device while the mobile device is at a location of the eligible merchant, identifying information usable by the merchant delivery service to verify that the customer contacted the eligible merchant, wherein the identifying information includes one or more of a position information of the mobile device or a Wi-Fi identifier;
   determining, by the merchant delivery service and subsequent to sending the notification, that the eligible merchant has converted to a participating merchant with the merchant delivery service;
   determining, by the merchant delivery service and based at least in part on the identifying information received from the mobile device, that the customer contacted the eligible merchant to recruit the eligible merchant; and
   in response to determining that the customer contacted the eligible merchant, providing, by the merchant delivery service, the incentive to the customer as a reward for contacting the eligible merchant and for the eligible merchant converting to the participating merchant with the merchant delivery service.

2. The computer-implemented method of claim 1, further comprising:
receiving, by the merchant delivery service and from the eligible merchant, an identifier, the identifier indicating a second customer;
determining, by the merchant delivery service and based at least in part on receipt of the identifier, that the second customer contacted the eligible merchant; and
providing, by the merchant delivery service, the incentive to the second customer as a reward for contacting the eligible merchant and for the eligible merchant converting to the participating merchant with the merchant delivery service.

3. The computer-implemented method of claim 1, further comprising:
sending, by the merchant delivery service and to at least one of the customer or the eligible merchant, an identifier associated with at least one of the customer or the eligible merchant; and
wherein determining that the customer contacted the eligible merchant to recruit the eligible merchant is further based at least in part on a receipt, from the eligible merchant, of the identifier.

4. The computer-implemented method of claim 1, wherein the incentive varies based on at least one or more of:
a number of participating merchants participating with the merchant delivery service; or
a duration of time since an attempt to activate the area initiated.

5. The computer-implemented method of claim 1, further comprising:
determining, by the merchant delivery service, that the eligible merchant is a key merchant; and
based at least in part on determining that the eligible merchant is a key merchant, increasing the incentive prior to sending the incentive to the customer.

6. A merchant delivery service, comprising:
one or more processors;
a memory coupled to the one or more processors and storing program instructions that when executed by the one or more processors cause the one or more processors to at least:
determine at least one eligible merchant within an area to be recruited to participate with the merchant delivery service;
determine at least one customer to incent to recruit the at least one eligible merchant;
determine an incentive for the at least one customer to incent the at least one customer to recruit the at least one eligible merchant to participate with the merchant delivery service and allow the merchant delivery service to cause delivery of products on behalf of the at least one eligible merchant;
notify the at least one customer of the incentive and the at least one eligible merchant;
receive, from a mobile device while the mobile device is at a location of the eligible merchant, identifying information usable by the merchant delivery service to verify that the at least one customer contacted the eligible merchant, wherein the identifying information includes one or more of a position information of the mobile device or a Wi-Fi identifier;
determine, subsequent to notification of the at least one customer of the incentive, that the at least one eligible merchant has converted to a participating merchant with the merchant delivery service;
determine, based at least in part on the identifying information received from the mobile device, that the customer contacted the eligible merchant to recruit the eligible merchant; and
providing, in response to receipt of the identifying information and determination that the eligible merchant has converted to the participating merchant, the incentive to the customer.

7. The merchant delivery service of claim 6, wherein the incentive is determined based on one or more of at least one eligible merchant, the at least one customer, a number of participating merchants within the area, a number of customers within the area, a number of customers that contacted the at least one eligible merchant, a time duration, a category associated with the at least one eligible merchant, a number of participating merchants associated with the category, or a preference of the at least one customer.

8. The merchant delivery service of claim 6, wherein the program instructions further cause the one or more processors to at least:
determine, prior to notifying the at least one customer of the incentive, an association between the at least one customer and the at least one eligible merchant.

9. The merchant delivery service of claim 6, wherein the program instructions further cause the one or more processors to at least:
determine a second incentive for a second participating merchant to incent the second participating merchant to recruit the at least one eligible merchant to participate with the merchant delivery service and allow the merchant delivery service to deliver products on behalf of the at least one eligible merchant;
notify the second participating merchant of the second incentive and the at least one eligible merchant;
determine, subsequent to the notification of the second participating merchant of the second incentive, that the at least one eligible merchant has converted to the participating merchant with the merchant delivery service; and
enable provisioning of the second incentive to the second participating merchant.

10. The merchant delivery service of claim 6, wherein the program instructions further cause the one or more processors to at least:
determine that a contact count for the at least one eligible merchant has not been exceeded, wherein the contact count indicates a number of customers that may contact the at least one eligible merchant to recruit the at least one eligible merchant to participate with the merchant delivery service.

11. The merchant delivery service of claim 6, wherein the program instructions further cause the one or more processors to at least:
determine that a minimum number of eligible merchants within a range of the area are participating merchants;
activate the participating merchants to allow the merchant delivery service to cause delivery of products from the participating merchants to customers within the area and on behalf of the participating merchants; and
send a notification to customers informing the customers that the area is active.

12. The merchant delivery service of claim 6, wherein the program instructions further cause the one or more processors to at least:
determine a second incentive for the at least one eligible merchant to incent the at least one eligible merchant to participate with the merchant delivery service;

notify the at least one eligible merchant of the second incentive;

determine, subsequent to the notification of the at least one eligible merchant of the second incentive, that the at least one eligible merchant has converted to the participating merchant with the merchant delivery service; and enable provisioning of the second incentive to the at least one eligible merchant.

13. The merchant delivery service of claim 6, wherein the merchant delivery service causes delivery of products on behalf of participating merchants using at least one of a human, a human powered vehicle, a human operated vehicle, a human controlled vehicle, or an autonomous vehicle.

14. A computer-implemented method, comprising:

determining, by a merchant delivery service executing on one or more computing resources, an area to activate the merchant delivery service in which the merchant delivery service causes delivery of products to customers on behalf of participating merchants;

determining, by the merchant delivery service, a plurality of eligible merchants in the area;

determining, by the merchant delivery service and for an eligible merchant of the plurality of eligible merchants, an incentive to provide to a customer to incent the customer to recruit the eligible merchant to participate with the merchant delivery service and allow the merchant delivery service to cause delivery of products on behalf of the eligible merchant;

sending, by the merchant delivery service, to the customer a notification indicating the eligible merchant and the incentive;

receiving, by the merchant delivery service and from a mobile device while the mobile device is at a location of the eligible merchant, identifying information usable by the merchant delivery service to verify that the customer contacted the eligible merchant, wherein the identifying information includes one or more of a position information of the mobile device or a Wi-Fi identifier;

determining, by the merchant delivery service and subsequent to sending the notification, that the eligible merchant has converted to a participating merchant with the merchant delivery service;

determining, by the merchant delivery service and based at least in part on the identifying information received from the mobile device, that the customer contacted the eligible merchant to recruit the eligible merchant; and providing, by the merchant delivery service and in response to receiving the identifying information and determining that the eligible merchant has converted to the participating merchant, the incentive to the customer as a reward for contacting the eligible merchant and for the eligible merchant converting to the participating merchant with the merchant delivery service.

15. The computer-implemented method of claim 14, further comprising:

determining, by the merchant delivery service, that a number of participating merchants within a range of the area does not exceed a threshold.

16. The computer-implemented method of claim 14, further comprising:

determining, by the merchant delivery service and prior to notifying the customer of the incentive, an association between the customer and the eligible merchant.

17. The computer-implemented method of claim 14, further comprising:

determining, by the merchant delivery service, a second incentive for a second participating merchant to incent the second participating merchant to recruit the eligible merchant to convert to the participating merchant with the merchant delivery service and allow the merchant delivery service to cause delivery of products on behalf of the eligible merchant;

notify, by the merchant delivery service, the second participating merchant of the second incentive and the eligible merchant;

determine, by the merchant delivery service and subsequent to notification of the second participating merchant of the second incentive, that the eligible merchant has converted to the participating merchant with the merchant delivery service; and enable, by the merchant delivery service, provisioning of the second incentive to the second participating merchant.

* * * * *